(12) United States Patent
Vulpius et al.

(10) Patent No.: US 10,076,866 B2
(45) Date of Patent: Sep. 18, 2018

(54) METHOD OF FORMING A PHOTONIC CRYSTAL MATERIAL

(75) Inventors: Günther Vulpius, Riedstadt (DE); Götz Peter Hellmann, Mainz (DE); Peter Wolfgang Andreas Spahn, Hanau (DE)

(73) Assignee: DE LA RUE INTERNATONAL LIMITED, Hampshire (GB)

( * ) Notice: Subject to any disclaimer, the term of this patent is extended or adjusted under 35 U.S.C. 154(b) by 874 days.

(21) Appl. No.: 13/381,015

(22) PCT Filed: Jul. 7, 2010

(86) PCT No.: PCT/GB2010/051118
§ 371 (c)(1),
(2), (4) Date: Mar. 6, 2012

(87) PCT Pub. No.: WO2011/004190
PCT Pub. Date: Jan. 13, 2011

(65) Prior Publication Data
US 2012/0161431 A1    Jun. 28, 2012

(30) Foreign Application Priority Data
Jul. 7, 2009    (GB) .................................. 0911792.0

(51) Int. Cl.
*B42D 15/00*    (2006.01)
*B42D 15/10*    (2006.01)
(Continued)

(52) U.S. Cl.
CPC ............ *B29C 55/18* (2013.01); *B29C 55/023* (2013.01); *B29C 55/06* (2013.01); *B29C 55/065* (2013.01);
(Continued)

(58) Field of Classification Search
CPC ........ B42D 15/00; G09C 3/00; G02B 6/1225; B29C 55/18; B29C 55/065; B29C 55/06;
(Continued)

(56) References Cited

U.S. PATENT DOCUMENTS 1,996,539 A    4/1935    Dufay
6,797,057 B1 *    9/2004    Amos et al. .................... 117/68
(Continued)

FOREIGN PATENT DOCUMENTS

EP    1 398 174 A1    3/2004
WO    WO 83/00659 A1    3/1983
(Continued)

OTHER PUBLICATIONS

Pursiainen et al., "Nanoparticle-tuned structural color from polymer opals," *Optics Express*, 2007, vol. 15, No. 15, pp. 9553-9561.
(Continued)

*Primary Examiner* — Justin V Lewis
(74) *Attorney, Agent, or Firm* — Oliff PLC

(57) ABSTRACT

A method of forming a film of photonic crystal material. A first process is performed upon a material capable of having a photonic crystal structure, this process causing deformation of the material so as to form a film in which incident light received by the material is selectively reflected or transmitted to generate a first optical effect in the film. A second process is performed upon substantially all of the film which applies a shear stress to the film. This causes a change in the material structure so as to generate a second optical effect in the film, different from the first optical effect, in response to incident light. Security films, devices, articles and documents formed using the method are also discussed.

43 Claims, 18 Drawing Sheets

(51) Int. Cl.
*G09C 3/00* (2006.01)
*B29C 55/18* (2006.01)
*B29C 55/02* (2006.01)
*B29C 55/06* (2006.01)
*B82Y 20/00* (2011.01)

(52) U.S. Cl.
CPC ...... *B82Y 20/00* (2013.01); *B29K 2995/0018* (2013.01); *Y10T 156/1002* (2015.01); *Y10T 428/24355* (2015.01)

(58) Field of Classification Search
CPC .................. B29C 55/023; B82Y 20/00; Y10T 428/24355; Y10T 156/1002; B29K 2995/0018
USPC ...... 283/72, 91, 93, 94, 95, 96, 98, 109, 74; 385/12, 37, 123, 125, 129; 65/393
See application file for complete search history.

(56) References Cited

U.S. PATENT DOCUMENTS

| | | | |
|---|---|---|---|
| 6,865,005 B2* | 3/2005 | Aoki | B82Y 20/00 359/237 |
| 2003/0085014 A1* | 5/2003 | Hada et al. | 162/361 |
| 2003/0122112 A1 | 7/2003 | Foulger et al. | |
| 2005/0095417 A1 | 5/2005 | Jiang | |
| 2005/0244122 A1* | 11/2005 | Itsuji | G02B 6/1225 385/129 |
| 2006/0254315 A1* | 11/2006 | Winkler | B82Y 20/00 65/21.4 |
| 2007/0178307 A1* | 8/2007 | Winkler et al. | 428/403 |
| 2009/0268292 A1* | 10/2009 | Nakai | 359/493 |
| 2010/0045027 A1* | 2/2010 | Whiteman | B44F 1/10 283/107 |

FOREIGN PATENT DOCUMENTS

| | | | | |
|---|---|---|---|---|
| WO | WO 90/02658 | A1 | 3/1990 | |
| WO | WO 92/11142 | A1 | 7/1992 | |
| WO | WO 95/10419 | A1 | 4/1995 | |
| WO | WO 95/10420 | A1 | 4/1995 | |
| WO | WO 97/19821 | A1 | 6/1997 | |
| WO | WO 98/20382 | A1 | 5/1998 | |
| WO | WO 98/25236 | A1 | 6/1998 | |
| WO | WO 99/28852 | A1 | 6/1999 | |
| WO | WO 00/39391 | A1 | 7/2000 | |
| WO | WO 03/054297 | A2 | 7/2003 | |
| WO | WO 03/061980 | A1 | 7/2003 | |
| WO | WO 03/091952 | A2 | 11/2003 | |
| WO | WO 03/091953 | A2 | 11/2003 | |
| WO | WO 2005/080089 | A1 | 9/2005 | |
| WO | WO 2007037502 | A1 * | 4/2007 | |
| WO | WO 2008017864 | A1 * | 2/2008 | B44F 1/10 |

OTHER PUBLICATIONS

Arsenault et al., "From colour fingerprinting to the control of photoluminescence in elastic photonic crystals," *Nature Materials*, 2006, vol. 5, pp. 179-184.

Amos et al., "Shear-ordered face-centered cubic photonic crystals," *Electronics Letters*, 2000, vol. 36, No. 16.

Kim et al., "Strain-tunable photonic band gap crystals," *Applied Physics Letters*, 2001, vol. 78, No. 20, pp. 3015-3017.

International Search Report in International Application No. PCT/GB2010/051118; dated Jan. 31, 2011.

* cited by examiner

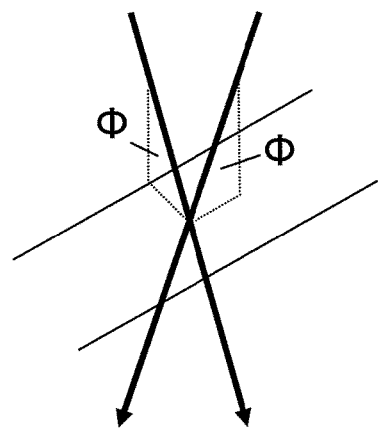
Figure 4
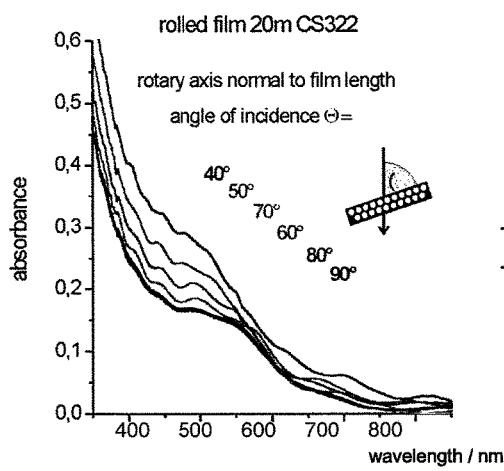 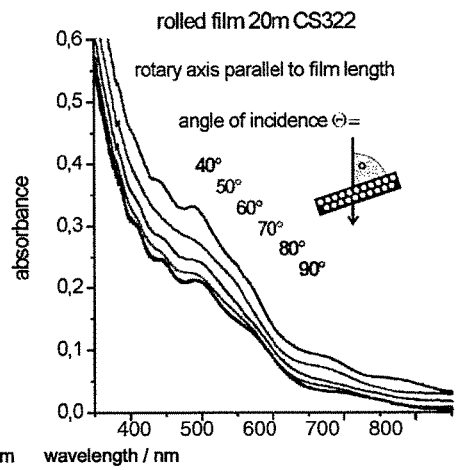
Figure 5a                Figure 5b

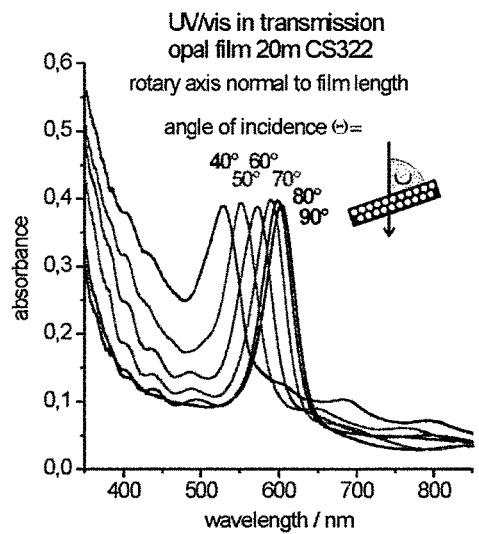
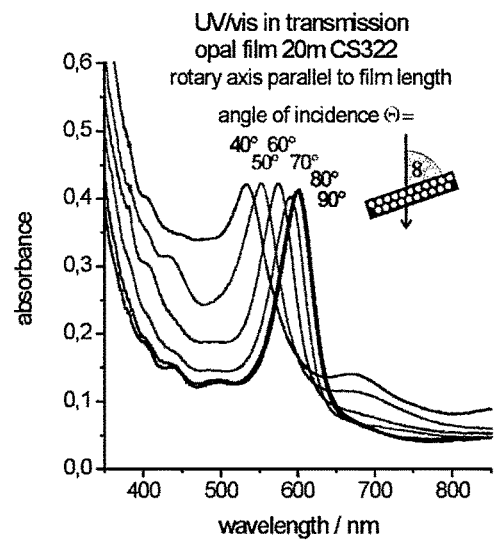
Figure 6a          Figure 6b
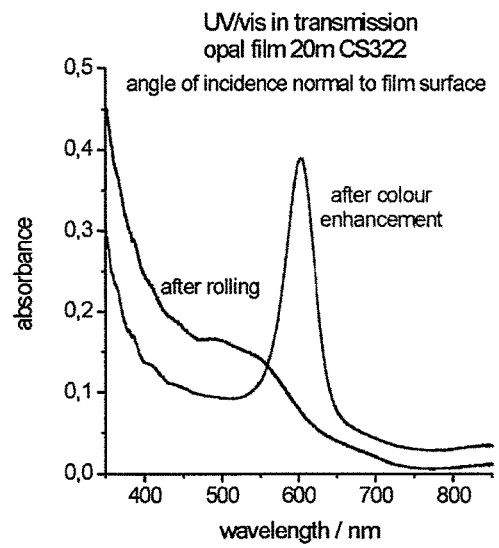
Figure 7

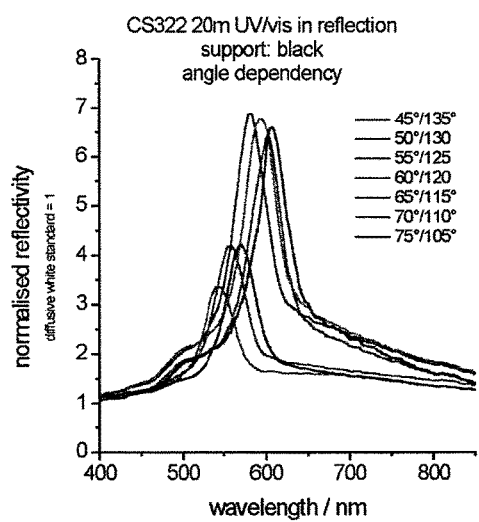 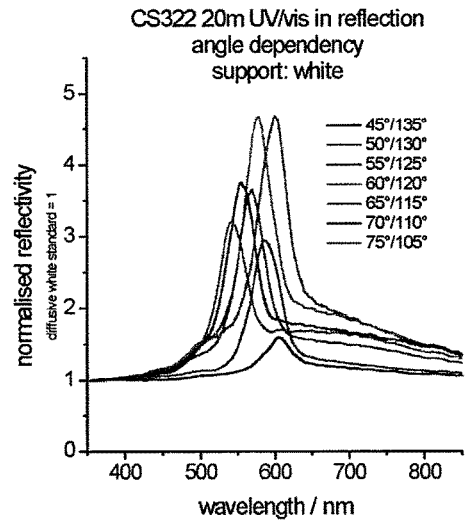
Figure 8a    Figure 8b
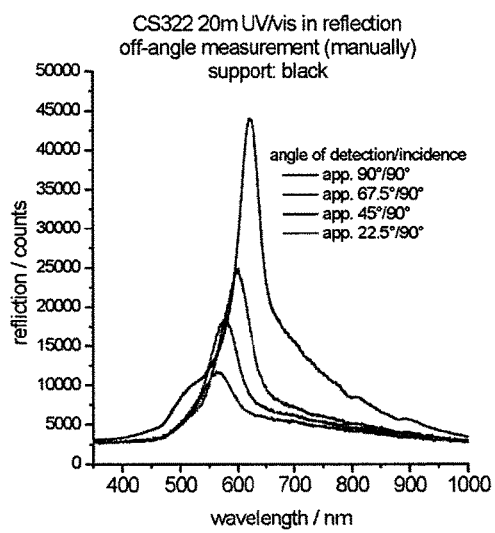
Figure 9

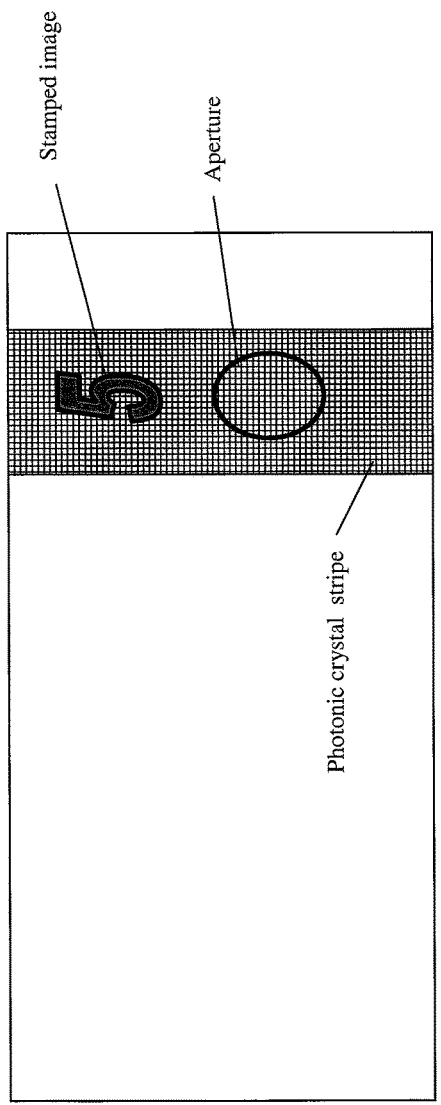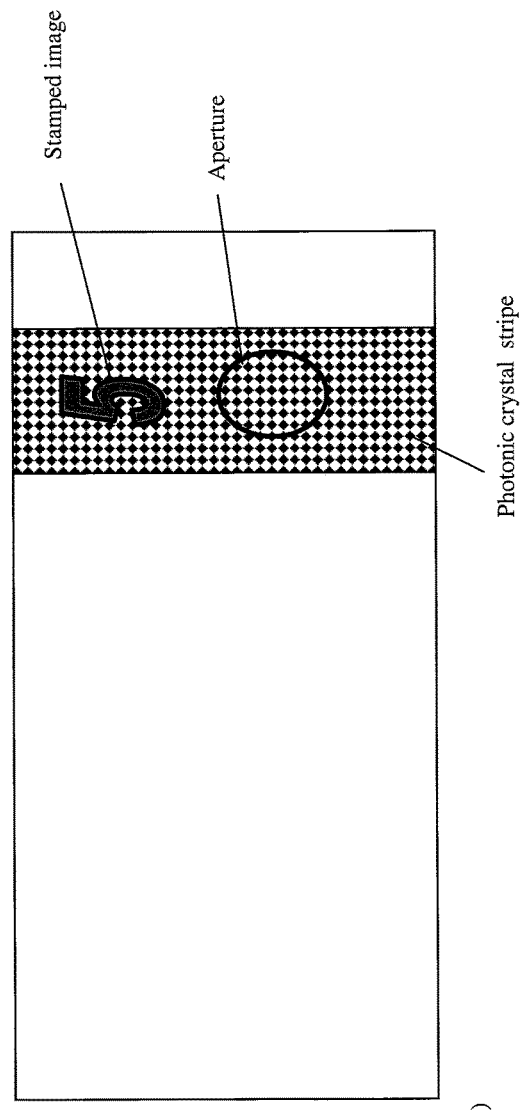
Figure 19 a) b)

METHOD OF FORMING A PHOTONIC CRYSTAL MATERIAL

FIELD OF THE INVENTION

The present invention relates to improvements in methods of forming films of photonic crystal material having an optical effect.

BACKGROUND TO THE INVENTION

Photonic crystals are structured optical materials in which the refractive index varies periodically in two or preferably three dimensions. These materials exhibit a range of interesting optical effects when subject to electromagnetic radiation of a wavelength comparable to the spatial modulation of the refractive index. Bragg reflection may occur over a range of wavelengths that depend on the direction of incidence/propagation and the periodicity of refractive index variation. This gives rise to photonic 'energy gaps' that are analogous to the electronic band gaps in semiconductors. Typically, electromagnetic waves within a certain frequency range cannot propagate in particular directions within the crystal, and incident electromagnetic radiation at these wavelengths is consequently reflected. It is the presence of such partial photonic band gaps that gives rise to the shimmering colours observed in opal gemstones.

In general there is a complex dependence on the wavelength, direction of propagation and polarisation that dictates which electromagnetic waves may propagate within the photonic crystal and those that are otherwise reflected. However, if the modulation in refractive index is sufficiently strong, propagation of certain frequencies can be forbidden for any crystalline direction, and a complete photonic band gap arises. In this case light is prevented from propagating within the crystal in any direction, and the material acts as an ideal reflector such that all light of a wavelength within the band gap range is perfectly reflected irrespective of the incident direction.

There exist two well-documented methods of fabricating structures with the necessary highly ordered variation in refractive index-microfabrication and self-assembly. Due to the complexity of microfabrication considerable effort has been devoted to investigating self-assembling systems comprised of submicron three-dimensional arrays of dielectric spheres. Such photonic crystals are formed by allowing a colloidal suspension of identically sized spheres to settle slowly under the influence of gravity or by the application of an external force such that the spheres are encouraged to order. One example is the fabrication of synthetic opal structures where uniformly sized sub-micron silica spheres are organised through a sedimentation process into a face-centred cubic crystal structure. Another example is the use of polymer "core-shell" particles. Here a core of a first polymer is surrounded (sometimes with an intermediate layer) by a shell of a second polymer. A photonic crystal material is formed by the heating of the particles such that the shell melts and forms a matrix within which the core particles arrange into a regular structure. This example is of particular interest because of the polymeric nature of the photonic crystal material which provides the potential for a range of new applications.

There is an ongoing desire to improve the techniques used in producing such photonic crystal structures with a view to providing substantial quantities of the materials at a low cost and in a form suitable for later applications. For this reason there is considerable interest in the production of photonic materials as films which may then be incorporated within or applied to a product. Unfortunately a significant problem exists because the fabrication methods inherent within film production are not always amenable to the preservation of the photonic structure of the materials. These effects are further amplified as the thickness of the films is decreased. The result is that film production techniques cause the reduction or even complete loss of any optical effects exhibited by the photonic crystal material. An objective of the invention is to address this problem so as to provide films of photonic crystal material in which a strong optical effect is present.

Further challenges exist in the production of such films on an industrial scale. One such challenge is the production of homogeneous optical properties such that all of the film can be observed to produce a similar optical effect. Known processing techniques can cause variations within the photonic crystal structure as a result of localised strains. These can result in films having significant variations in optical properties in different regions, which increases wastage and costs. Furthermore, other challenges exist in the provision of films which may be readily handled, particularly in the case of films which are thin (for example under 100 micrometres) where the film strength may be low or surface stickiness may prevent ease of use.

SUMMARY OF THE INVENTION

In accordance with a first aspect of the invention we provide a method of forming a film of photonic crystal material, comprising:
providing a material capable of having a photonic crystal structure;
performing a first process upon the material which causes deformation of the material so as to form a film in which incident light received by the material is selectively reflected or transmitted to generate a first optical effect in the film; and
performing a second process upon substantially all of the film which applies a shear stress to the film, thereby causing a change in the material structure so as to generate a second optical effect in the film, different from the first optical effect, in response to incident light.

We have therefore overcome the problems caused by known film production techniques in generating films of photonic crystal materials by the application of a second process which applies a shear stress to the film. The shear stress is typically applied by the use of dissimilar forces in opposed surfaces of the film. Thus the forces may be in a similar direction and of a different magnitude or may be in opposed directions and of either a similar or dissimilar magnitude. It is also contemplated that the respective forces may not be aligned in either the same or opposed directions. The shear forces are therefore preferably applied in directions lying substantially within or parallel to planes defining the surfaces of the film. It is contemplated that the application of the shear stress by the second process may include a simultaneous application of a compressive stress. In applying the shear stress to ensure substantially all areas of the film surface are processed it will be understood that the magnitude of the shear stress is typically in excess of any compressive or indeed tensile stresses applied by the same process. Typically therefore, the primary effect of the application of the shear stress is to cause local rearrangement of the particles within the film so as to enhance its photonic crystallinity. Thus, typically the second process does not substantially affect the thickness of the film. Indeed the process may induce a shear strain which causes a minor amount of elongation.

In general, the shear stress is applied to substantially all of the film in each of its two major dimensions (other than the thickness). Therefore the resultant film provides a similar second optical effect at all observed locations across its surface. It is expected that in some cases, some rearrangement of the material may occur throughout the film thickness and therefore substantially all of the film may be treated in each of its three dimensions. However, this is not essential, particularly in thicker films where regions closer to the surfaces may be responsible for generating much of the second optical effect and central regions of the film thickness may remain substantially unaffected. The invention contemplates the simultaneous application of the shear stress to substantially all of the film by the second process. However, it will be preferred in many cases to apply the shear stress to a local processing region which is passed along the length of the film (typically by moving the film). This is beneficial to longer lengths of film such as in the case of semi-continuous or continuous processing.

The first optical effect, which is present prior to the application of the second process, is intended to be interpreted broadly as including any optical effect. In essence the first optical effect may therefore be either a photonic effect or a non-photonic effect and include the natural appearance of the material prior to any form of film processing. Depending upon the material it may however include a photonic effect or other optical effect caused by the first process, including an optically variable effect.

Although the second optical effect may be a photonic effect which is not optically variable (that is, it is not dependent upon the viewing or illumination position) such as broadband reflection, it is preferably an optically variable effect. The second effect may therefore be an entirely distinct effect from that of the first effect. In other cases it may be an enhanced effect which produces a higher intensity response to the incident radiation and yet produces a similar spectrum as a function of viewing and illumination position. In each case the second effect is typically caused by an increase in photonic crystalline order and, where an enhanced effect is produced, this represents an increase in order within respect to the degree of ordering already present as a result of the first effect.

We note here that reflected light in the context of the present invention includes both specularly reflected light and scattered light. It should also be noted that various types of photonic crystals may be used to achieve the present invention, and the term "photonic crystal" is intended to include quasi-crystals that exhibit this effect, as well as more conventional ordered "non-quasi" photonic crystals.

The optical effects of the invention are not intended to be limited to operate only in the wavelengths observable by the human eye. Thus, in addition to visible light it is intended that the invention may be practised at other non-visible wavelengths including ultra-violet and infra-red regimes within the electromagnetic spectrum. One or each of the first and second optical effects may be in the visible or non-visible parts of the spectrum. When the incident light is produced by a white light (broad wavelength band) source, preferably at least the second optical effect is a colour effect. Whilst the first and second effects are preferably observed as reflective effects, transmissive effects are also contemplated.

With reference to the film itself, typically the film has a maximum dimension in an elongate direction, an intermediate dimension in a width direction that is substantially normal to the elongate direction, and a minimum dimension in a thickness direction that is substantially normal to each of the elongation and width directions. In this case the second optical effect is present across substantially the full width of the film in the width direction. Similarly the second optical effect is present along substantially the full length of the film in the elongate direction, which provides that substantially all of the film area exhibits the second optical effect.

The film may be produced in batches, in which case each batch may provide a long length of film, for example tens of metres in length. In order to produce the film most efficiently it is preferably produced as a continuous film. For example, provided a supply of materials is assured for generating the film, it may be continuously produced and processed, followed by spooling and cutting downstream, prior to or subsequent to any further processing.

The method is, in principle, not limited to any particular film thicknesses, although it finds particularly beneficial application where the thickness of the film is 100 micrometres or less. Most preferably the film has a thickness of 40 micrometres or less. Thin films of 100 micrometres or less are particularly beneficial for many security applications since they may be incorporated into documents of value and thereby provide new optical effects which are extremely difficult to counterfeit.

A number of different techniques may be used for producing the film according to the first process. Where the films are polymeric, the production methods include rolling, calendaring, film blowing or flat-film extrusion.

In the production of a strong and homogeneous second optical effect it is beneficial to ensure that the film has a smooth surface prior to application of the second process. This may be achieved by performing a calendaring process on the film before performing the second process (and therefore as part of the first process or as an intermediate process). Typically such a calendaring process applies a pressure to the film of between 50 and 200 bar (about 5 to 20 MPa) and at a temperature of 80 to 120 Celsius. Once the film has been processed to produce the second optical effect it is beneficial to ensure the long-term stability of the optical effect. This may be achieved by a process of cross-linking. Such cross-linking may be achieved by the provision of additives within the film material which are responsive to stimulation by heat or ultra-violet light. It is preferred that thermal cross-linking is performed since the second process is typically performed at an elevated temperature which may simplify the processing required. Cross-linking may also be used to reduce any surface stickiness of the films.

The photonic crystal film resulting from the process may be provided in a number of forms, for example as a self-supporting layer. Alternatively, it may be supported by a substrate or carrier layer to which it is mounted directly or indirectly (through one or more further layers). The substrate or the carrier layer may take the form of a polymeric layer.

The method preferably includes applying a cover film to one or each of the opposing surfaces of the film before the performance of the second process. The use of one or more cover films provides benefits in that they protect the photonic crystal film for example from surface damage due to the use of rollers and guides. They also may provide mechanical support to the film, providing ease of handling. Cover films provide further convenience where the photonic crystal film surface is tacky which may otherwise cause damage when handling. In addition to each of these benefits, one further important and surprising benefit is that the one or more cover films may be used within the second process to achieve the application of the shear stress. Thus, the shear stress of the second process is preferably applied to at least one of the said cover films. When the cover films are used within the second process they serve to equalise the shear stress of the processed area such that the stress may be applied evenly. The result of this is that the second optical effect is extremely homogeneous and applied evenly to all parts of the photonic film surface. It is preferred that the cover films are applied to each of the opposing surfaces. The effect of this is that the second process causes the displacement of one cover film with respect to the other in the elongate direction of the film. One or each cover film may also function as a substrate or carrier layer.

Depending upon the type of photonic crystal material used for the film, the processing may be performed at ambient temperature. However, particularly in the case of polymer films, each of the first and second processes are preferably performed at respective first elevated and second elevated temperatures whereby, between the application of the first and second processes, the temperature of the material remains substantially at or above the second elevated temperature. In general each of the first and second elevated temperatures are arranged to be in excess of the glass transition temperature of a polymer matrix component of the photonic crystal material.

It will be understood that the method is not limited to any particular type of photonic crystal material, particularly since it is not required that a photonic crystalline structure results as an output of the first process, although preferably partial photonic crystallinity is achieved. The method is particularly suited to polymeric materials and preferably the photonic material comprises a polyethylacrylate matrix containing spheres of cross-linked polystyrene.

The first process may include an extrusion process in which a film is produced as a result of forcing the material through an extrusion die with a cross section being similar to that of the film. However, it has been found that it is not necessary for a film itself to be extruded and therefore other non-film cross-sections may be produced in which case the extrusion may be thought of as a first sub-process. In this case a further sub-process which is part of the first process, converts the extrudate into a film, an example of such a process being a rolling process.

A number of different second processes are contemplated by the present invention. A preferred example is that the shear stress of the second process is applied by passing the material over at least one sharp edge. Where heating of the film is a requirement of the second process, then the second process may be performed within a heated chamber.

In the case of an edge, it is beneficial to ensure a significant directional change of the film at the point of contact with the edge. It is preferred that the respective parts of the film, upstream of the edge, passing over the edge, and downstream of the edge, define an angle of 120 degrees or less, wherein the said angle is subtended by the edge. A potential problem with small angles is to provide smooth flow of the film over the edge surface. This may be addressed with the provision of a low friction material at the edge, such as a polytetrafluoroethylene. The edge may also be heated, for example to a temperature of 200 degrees Celsius.

It is important that the film remains urged against the edge in order to apply the shear stress. Rollers may be used to grip the film upstream and downstream of the edge in order to control the shear stress applied. When the second process is applied at an elevated temperature, the upstream rollers may be heated. Furthermore, regardless of whether heated rollers are used upstream, the cooling of the film following the second process may be performed using one or more cooled rollers.

Each of the first and second optical effects may be modified or enhanced by the use of additional additives within the material itself. The material of the film may further comprise an optically absorbent material within the film crystal structure itself. The inclusion of such an optically absorbent material can be used to enhance the optical effect to an observer, or used to modify the optical effect by the use of for example absorbent materials that are selectively absorbent at the wavelengths of light used. Dyes or inks may be used for this purpose.

It has been reported in the scientific literature, (see Optics Express, Vol. 15, No. 15, Page 9553-9561, 23 Jul. 2007), that nanoparticles can be introduced into the matrix of a photonic crystal in order to change or enhance the observed colours, colourshifts and tolerance on illumination angle.

In addition or as an alternative to any optically absorbent additives, the optical properties according to the second optical effect may be further modified or enhanced by the use of nanoparticles positioned within the crystal structure of the film, preferably at interstitial sites. The nanoparticles may be distributed substantially uniformly through the film such that each part of the film exhibits substantially the same optical effect. Alternatively the nanoparticles may be distributed inhomogeneously through the film such that different parts of the film exhibit a substantially different optical effect. Thus the nanoparticles may be distributed according to a concentration gradient, for example in the through-thickness direction where a relatively high concentration at one surface reducing to a relatively low concentration at the opposing film surface. The concentration gradient may also be arranged to be symmetrically distributed about the centre of the film thickness (for example higher or lower at the centre with respect to one or each surface).

Preferably the size of the nanoparticles is selected such that they sit within the interstitial sites of the crystal lattice. The nanoparticles enhance resonant scattering events that occur within the photonic crystal giving rise to strong structural colours.

For example the incorporation of carbon nanoparticles less than 50 nm in diameter into a material comprising polystyrene spheres with a sphere size of 200 nm in a polyethlyacrylate matrix, enhances the resonant scattering of the photonic crystal and dramatically alters the appearance of the photonic crystal film from one with a weakly coloured opalescence appearance to an intensely coloured green film. In this way the first optical effect may be a strong photonic optical effect, whereas in the absence of the nanoparticles such an effect may be only weak or non-photonic in nature. The second optical effect may of course also be enhanced or modified with respect to the second optical effect in the absence of the nanoparticles.

The use of the nanoparticles therefore provides a key advantage in that intense colours are observed and there is an increased tolerance on illumination angle such that the observed colour is no longer as dependent on the position of the light source. In another example magnetite nanoparticles can be incorporated to generate a magnetic machine-readable colourshifting film.

It is preferred that when the polymeric photonic crystal film is produced by an extrusion process, the nanoparticles are added to the polymer reservoir prior to extrusion. The particles may be made from material which is orientable in an electric, magnetic or electromagnetic field. In this way, alignment of the particles may be effected by selective application of that specified field to the photonic crystal film prior to any final cross-linking step in the film production.

Nano-photoluminescent particles such as quantum dots may be added to create a novel photoluminescence effect which may be used as a security feature. For example PbS nanoparticles can be added to produce luminescent films. It has been shown in the scientific literature (Nature Materials Volume 5 Mar. 2006 Page 179) that embedding quantum dots in a photonic crystal results in suppression of luminescence if the emission frequency falls within the band gap of the photonic crystal. If the position of the photonic band gap varies according to the direction of the incident light relative to the crystal orientation, such that it overlaps or crosses through the photoluminescence peak of the embedded emitter, suppression/enhancement of emission and dynamic modification of the luminescence lifetimes may occur creating an effect where the fluorescence or phosphorescence is switched on or off by simply rotating the device relative to the incident radiation.

The first and/or second optical effects may be characterised using techniques such as spectroscopy, for example reflective or transmissive. For example, the second optical effect may be characterised by a peak in the transmissive absorbance spectrum taken through the film. The peak may exhibit a shift in wavelength as a function of rotation of a line defining an emitter and detector, the line passing through the film and rotating about a rotation axis lying within the plane of the film. Typically such a rotation axis is aligned parallel to the direction of elongation of the film or perpendicular to that direction.

Further processing methods may be performed upon the film, such as the application of a third process to the film so as to modify the structure of the material in one or more regions. For example the third process may provide one or more regions have an at least approximately opal-like structure having a reduced degree of crystal ordering with respect to the rest of the film (having an opal-like structure). Thus, the third process may be a deformation process which causes disordering of the material structure in the one or more regions, either by the displacement or the deformation of the objects (such as spheres) which make up the crystal structure. The third process may be an embossing process, wherein the embossing takes place during an intaglio printing process and is carried out using an intaglio plate.

Another example third process is where the photonic crystal structure of the film comprises a number of objects of similar geometry, formed from a first material, located within a matrix of a second material, different from the first. The third process of the method may comprise removing the objects of the first material from the photonic crystal material when arranged in an opal-like structure, so as to form an inverse opal-like structure. Alternatively the whole film may be treated in this manner, rather than the application to specific regions. The objects may be removed by applying a solvent to the objects. Such a solvent may be applied by one or more of the processes of: immersing the material in a bath of solvent or printing the solvent onto the photonic crystal material. Furthermore, prior to the removal of the objects, an area of the material may be protected by the application of a mask. As a further process, the method may comprise applying a further deformation process to part of the inverse opal-like structure.

A second aspect of the invention comprises a film made in accordance with the first aspect of the invention. Films produced according to the method of the present invention find numerous applications. One such application is the incorporation of the film into a security device. Thus in accordance with a third aspect of the invention we provide a security device incorporating a film produced in accordance with the method of the first aspect. Such a security device may include a number of additional layers or elements. For example the security device may be provided with an adhesive layer upon one or each outer surface thereof. It may also comprise a scattering layer to increase the visibility of optical effects at wider viewing angles. An optically absorbent material may also be provided as one or more layers applied to the device. The absorbent material may be selectively absorbent at light wavelengths and may be provided as an ink or dye.

The security device may further comprise a metallised layer. Preferably such a layer is selectively demetallised at a number of locations. In addition the device may further comprise a layer of resist upon the metallised layer. The metallised layer and/or the layer of resist is preferably arranged as indicia. Such layers with or without indicia may be visible from the same side of the photonic crystal that receives the light, or from the reverse side. Transmissive viewing of the layers is also contemplated.

It is also preferred that the device is arranged to be machine-readable. This may be achieved in a number of ways. For example at least one layer of the device (optionally as a separate layer) or the photonic crystal itself may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

Typically the device is formed from a number of different layers and the device is adapted to be substantially planar. The device may be adapted to be observed from first and second opposing sides. In order to enhance the security features of the device, the surface of the photonic crystal film may be embossed with raised structures and/or overprinted. A latent image may also be formed which is selectively visible according to the viewing angle. Other security features may be included within the device, for example the security device may further comprise a hologram.

The security device may be used in many different applications, for example by attachment to articles such as objects of value. The security device may take various different forms for use with such articles, these including a security thread, a security fibre, a security patch, a security strip, a security stripe or a security foil as non-limiting examples.

In accordance with a fourth aspect of the invention there is provided an article comprising one or more security devices in accordance with the third aspect of the invention. Preferably, the security devices are adhered to or substantially contained within the article. Such articles include security documents in the form of a bank note, driving licence, passport, identity card, credit or debit payment cards, fiscal stamp, cheque, postal stamp, certificate of authenticity, brand protection article, bond or payment voucher. Other articles include general packaging and particularly packaging for pharmaceuticals or other items whose authenticity is desired to be assured.

The security device may therefore be attached to a surface of such an article or it may be embedded within the article so as to provide photonic crystal surfaces for receiving incident light on one or each of opposing faces of the article. The device may be embedded within a window so as to provide crystal surfaces for receiving incident light on each of opposing faces of the document. Each of these features is particularly beneficial for security document applications.

In accordance with a fifth aspect of the invention there is provided apparatus for forming a film of photonic crystal material, comprising:
a film generator adapted to perform a first process upon the material which causes deformation of the material so as to form a film in which incident light received by the material is selectively reflected or transmitted to generate a first optical effect in the film; and
a shearing processor adapted to perform a second process upon substantially all of the film which applies a shear stress to the film, thereby causing a change in the material structure so as to generate a second optical effect in the film, different from the first optical effect, in response to incident light.

Thus the film generator may take the form of any of the apparatus discussed herein for performing the first process, for example an extruder. The shearing processor may therefore comprise apparatus including one or more sharpened edges or any other apparatus for performing the shearing function. Preferably the apparatus according to the fifth aspect is adapted in use to perform the method of the first aspect of the invention and may include further processing apparatus to generate films, security devices, articles and documents according to the other aspects of the invention.

BRIEF DESCRIPTION OF THE DRAWINGS

Some examples of method of forming films of photonic crystal material are now described with reference to the accompanying drawings, in which:—

FIG. 4 shows two measurement regimes for use with a transmissive spectrometer;
FIGS. 5a and 5b show absorption spectra of the example films in parallel and normal configurations after extrusion;
FIGS. 6a and 6b show corresponding spectra of the example films following the shearing process;
FIG. 7 shows a comparison between the spectra before and after the colour enhancement process;
FIGS. 8a and 8b show reflection spectra illustrating the Bragg peak with a black and white background respectively;
FIG. 9 shows the effect of off-gloss angles;
FIGS. 19a and 19b show a ninth example document using hot stamped regions when viewed from different angles.

DETAILS OF PREFERRED EXAMPLES

Figure 1:
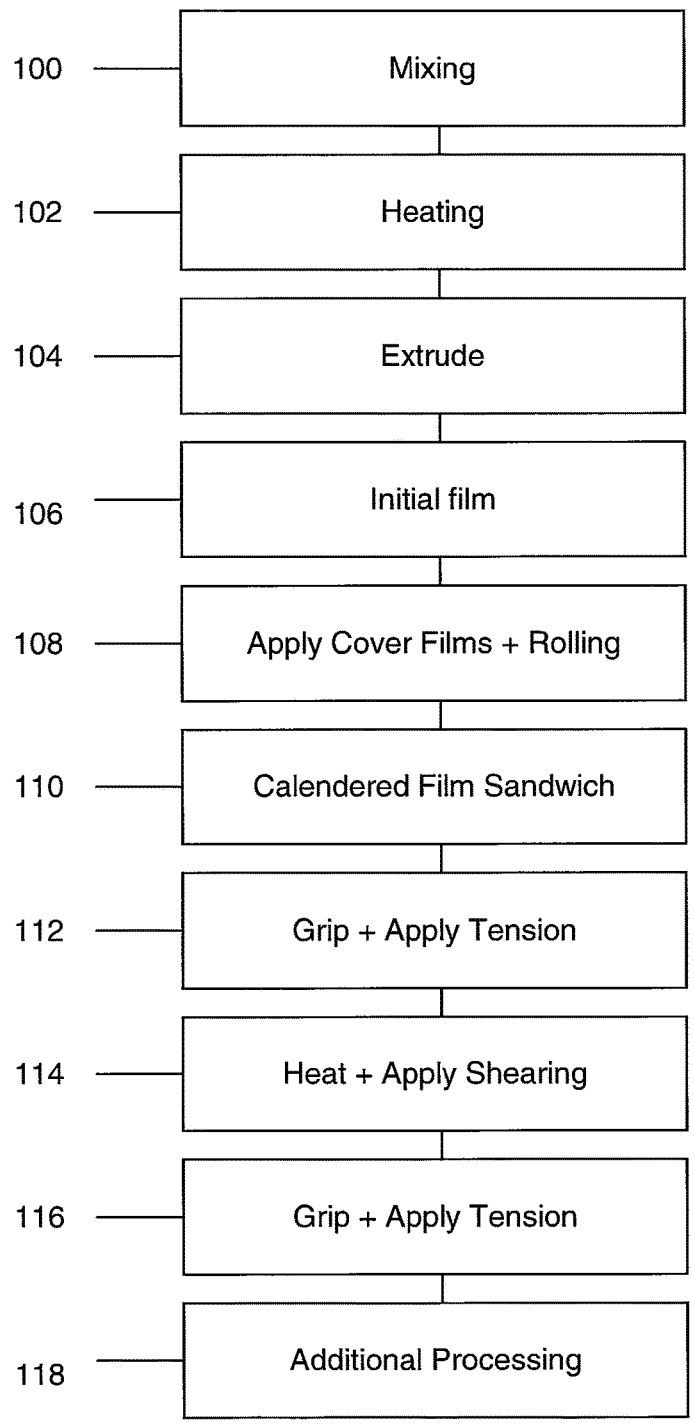
FIG. 1 is a flow diagram illustrating the example method.

We now describe a method, together with suitable apparatus, for producing a thin film of photonic crystal material which exhibits a strong angularly dependent colour effect. We then describe the use of the film in various example applications related to security devices and documents.

Materials

The present invention is not intended to be limited by the specific use of certain materials and this example now illustrates one practical implementation. As has been explained known methods of forming photonic crystal materials include micro fabrication and self-assembly. Due to the complexities of micro fabrication processes, it has become preferred in the art to use self-assembly. Synthetic opal structures can be formed by such a mechanism where uniformly sized sub-micron siliceous spheres are organised through a sedimentation process in a face-centred cubic crystal structure. Likewise, inverse-opal structures can also be formed by the dissolution of the siliceous spheres. Whilst the present invention can in principle be implemented with such materials, it is preferred that the materials of the films exhibiting photonic crystal structure are based upon polymer technology and it is this technology which is utilised in the present example. Polymeric based photonic crystal materials are particularly suitable for the present invention and preferably these comprise polymeric materials for each of the matrix and the "spheres". Thus the crystal may be formed from spheres of a first material and the matrix of a second material, each being polymeric in nature and exhibiting a different respective refractive index. Whilst the discussion herein focuses upon the provision of "spheres", in principle however many other shapes may be used including ellipsoidal, cylindrical and other geometries.

Materials suitable for forming the spheres are preferably single polymer or copolymer materials. Examples of these include both polymers and copolymers of polymerisable unsaturated monomers, and polycondensates and copolycondensates of monomers containing at least two reactive groups. For example such groups include high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde, phenol-formaldehyde condensates. Materials suitable for forming the matrix include polymers and copolymers of polymerisable unsaturated monomers and also of the polycondensates and copolycondensates of monomers having two or more reactive groups, e.g., high-molecular-weight aliphatic, aliphatic/aromatic or wholly aromatic polyesters and polyamides, but also of the amino and phenolic resins such as melamine-formaldehyde, urea-formaldehyde and phenol-formaldehyde condensates.

It is preferable to use polymeric materials for each of the matrix and the spheres since these are together more easily formed into films. The polymer materials for each of the matrix and the spheres may be selected to maximise the respective refractive index difference. Typically such a refractive index difference should be at least 0.001, more preferably greater than 0.01 and even more preferably greater than 0.1. Non-polymeric materials are also envisaged for the spheres and/or the matrix and they may comprise inorganic or metallic materials or a hybrid composite.

One convenient method for reproduction of photonic crystal materials having both a matrix and particles formed from polymers is the use of core-shell (CS) particles. As a typical example, each core-shell particle may consist of a highly cross-linked polystyrene core, coated with a cross-linked polymethylmethacrylate (PMMA) interlayer and a soft, meltable, shell of polyethylacrylate (PEA). The refractive index difference in this case is about 0.12 between the core and the shell. The advantage of using PEA is due to its low glass transition temperature of −15° C. The PMMA interlayer is useful for providing sufficient grafting of the PEA shell chains on the core via the reactive cross-linking molecule allylmethacrylate (ALMA). However, such materials when formed into thin films do encounter some problems, particularly in that the film strength may be too low and the surface of the film is sticky or tacky.

Providing an additional degree of cross-linking increases the elasticity and reduces the stickiness. Taking the above material as a starting point, a number of modifications were applied to the chemistry. Firstly copolymerisation of the ethylacrylate with isobutylmethacrylate increased the glass transition temperature of the shell polymer slightly. Secondly, the shell polymer was slightly pre-crosslinked during the emulsion polymerisation process by which the core-shell particles are formed. Thirdly, OH-functionality was introduced into the shell polymer to allow thermal crosslinking. Furthermore, the crosslinked interlayer was modified by changing the material from PMMA to polyethylacrylate.

Three different example core-shell particle chemistries provided high quality core-shell particles according to the above. These were: Sample 1 (denoted CS322) had a polystyrene core containing 10% of butanediol diacrylate (BDDA), a PMMA interlayer with 10% ALMA, surrounded by a PEA outer shell containing 2% of hydroxyethyl methacrylate (HEMA); Sample 2 (denoted CS354) had a polystyrene core containing 10% of butanediol diacrylate (BDDA), a PEA interlayer with 10% ALMA, surrounded by a PEA outer shell containing 3% of hydroxyethyl methacrylate (HEMA). Sample 3 (denoted CS355) had a similar core and interlayer to Sample 2, and a modified outer shell of 71.72% Ethyl Acrylate, 25% iso-Butyl Methacrylate (iBMA), 3% HEMA and 0.18% Diallyl Phthalate (DAP). Each had a peak particle size distribution of about 300 nm. The particle size distribution was investigated by hydrodynamic fractionation. Use of a particle size distribution analyser confirmed the standard deviation of the particle size diameter to be less than 10%.

The batches for use in the production of the films were prepared by coagulation of the aqueous lattice in methanol, saturated with sodium chloride, followed by filtering and drying in a convective oven at 45° C. for 2 days. The dried polymer was then milled with dry ice prior to being provided to the extruder to be discussed below. An alternative technique would be to use spray drying including the use of additives to prevent coagulation.

Powders produced by either of these techniques may then be used and mixed with pigments and any other additives, within the melt formed by an extruder. The use of pigments and other additives during general extrusion processes is known within the polymer processing industry.

Having given examples of the initial materials for the production of the photonic crystal film, we now describe the method itself. With reference to the flow diagram of FIG. 1 and system diagram of FIG. 2.

Extrusion

The first step 100 shown in the flow diagram of FIG. 1 is the mixing of the component materials (in the form of fine powders) prior to supply to an extruder. The powders in the present case comprise either of the three example materials mentioned above. The selected material is mixed within step 100 with a small amount of carbon black, in this case 0.1 weight %. The mixing occurred in a fluid-bed blender to which were added other additives such as waxes (1 wt % Ceridust 3615) this being to resist baking of the polymer powder, together with 1 wt % Licolub FA1 as an additive to keep the film surface less sticky. Each of these additives is available from Clariant International Limited in Switzerland. In addition, the blocked polyisocyanate Crelan UI (3 wt %) from Bayer MaterialScience AG in Germany is provided to aid thermal cross-linking. Other additives could also be used such as anti-oxidants, UV protection additives or surface additives.

The mixture is then applied to an extruder. Various different extruders (including single and double-screw configurations) can be used. In the present case a single screw extruder was used to extrude a film of material through a narrow rectangular extrusion die. This is represented in FIG. 1 where at step 102 the mixture is heated and at step 104 the material is extruded. It will be noted that each of steps 102 and 104 effectively occur simultaneously. A typical temperature for extrusion in this example is 140° C. to 150° C. A simple rectangular dye is used in the present case to produce films having thicknesses between 40 micrometres and around 100 micrometres. This is represented at step 106 where an "initial film" is produced by the extruder. Typically the initial film as produced at step 106 only includes relatively weak colour effects (first optical effect).

Figure 2:
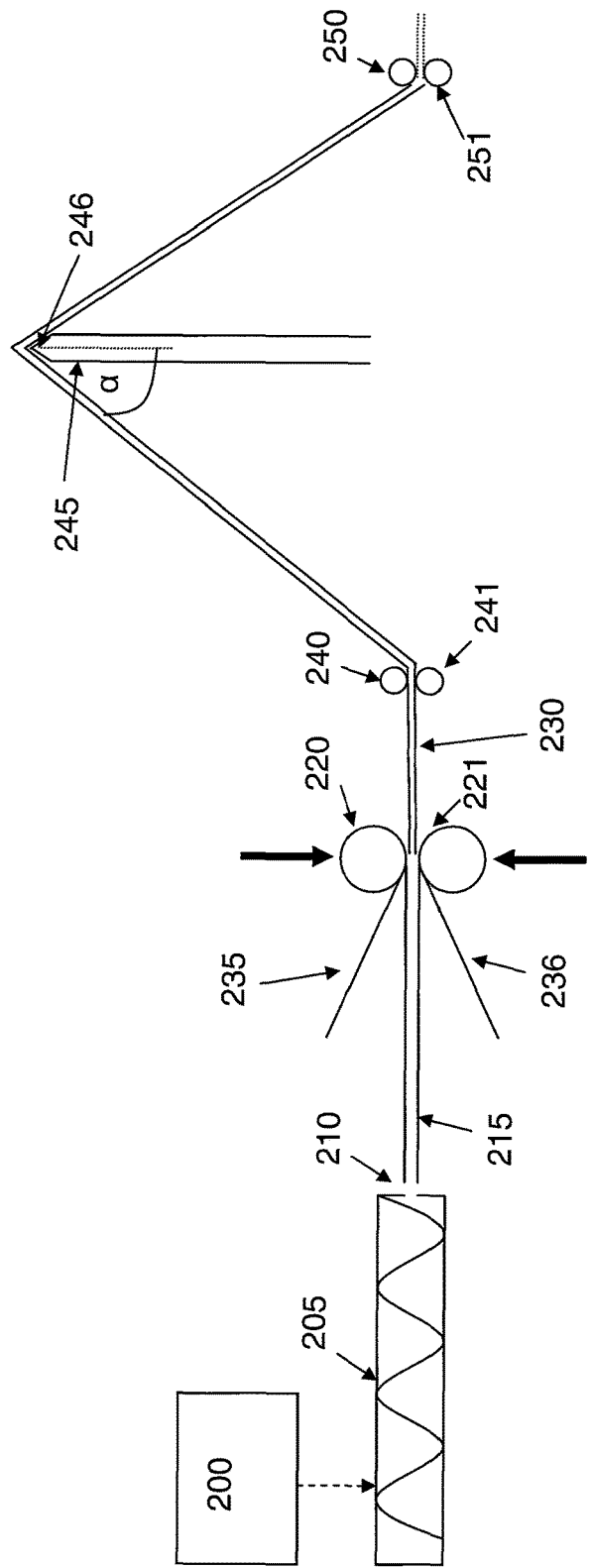
FIG. 2 is a schematic diagram of apparatus for performing the method.

Referring now to FIG. 2 which shows a schematic arrangement of the apparatus used for performing the method, the fluid-bed mixer is illustrated at 200 and the mixed powders are schematically illustrated as being passed to a proximal end of the extruder 205. At a distal end of the extruder a narrow die 210 is used to form the initial film 215.

Calendering

In order to reduce the thickness of the film and in order to improve the surface smoothness of the opposing surfaces of the film, in many cases it is preferable to apply a rolling process, after the extrusion, at step 108. Since this is a high pressure rolling treatment involving smooth surfaced rollers, it is a calendering treatment in the present case. This is achieved by the use of rollers 220 and 221 upon either side of the initial film 215. These rollers are forced together as indicated by the arrows 225 using a pressure of between 50 and 200 bar (about 5 MPa to 20 MPa). It should be noted that the rollers are heated. Even though the material arrives at a temperature not much less than the temperature at which it leaves the extruder (around 140 to 150° C.), unless the rollers are heated then contact with them may substantially reduce the surface temperature and cause a thermal gradient within the film. In the present case a temperature of 120° C. and 200 bar (20 MPa) is used for the calendering.

A second function of the rollers 220,221 is to apply an upper cover film 235 to an upper surface of the initial film 215 and also to apply a corresponding lower cover film 236 to the lower surface. The cover film in each case is wider than the initial film 215 and each cover film 235, 236 is fed between the respective roller 220, 221 and the surface of the film in question. The cover film in each case is formed from polyethylene terephthalate (PET). The heat and pressure applied by the rollers 220, 221 causes the PET cover films to adhere to the respective surfaces of the initial film 215. The respective cover films 225, 236 are shown in FIG. 2 and are applied at step 108 in FIG. 1. The calendering by the rollers produces a calendered film sandwich at step 110 denoted as a calender film 230 having a width of about 3 cm and a thickness of around 20 micrometres (excluding the PET cover films).

One additional advantage of the use of the calendering rollers is that the shape of the die 210 is not critical and indeed it has been found that a circular dye may even be used. Following calendering, the film between the two cover films does not exhibit much colour.

Although the calendering process is advantageous, particularly for thin films, it is not essential for the production of the optical effects according to the invention. Since there is however little or only weak colour effects exhibited either by the initial film 215 or the calender film 230, a further process for providing significant colour enhancement is then needed so as to produce an appreciable optical effect throughout the film so as to provide the associated benefits for its intended applications.

Shearing

In order to produce a strong optical effect, the film is then subjected to a process which applies a strong shear force between the opposing (upper and lower) surfaces of the film. Various mechanisms may be used to achieve this although what is common to each of them is that typically a net force is applied within one surface, in the direction of elongation of the film, and substantially parallel to that surface, with respect to the opposing surface. This can be thought of as a force which will cause the net displacement of one PET cover film with respect to the other in a direction of elongation of the film itself.

Returning now to FIG. 2, the film sandwich in the form of calendar film 230 is firstly passed through two tensioning rollers 240, 241 on opposing sides of the film to ensure that the film is gripped tightly. The film is then passed over a heated sharp edge running at least the width of the film. In this case the edge is provided as an edge of a metallic heated plate 245. In this case glass fibre reinforced polytetrafluroethylene (PTFE) is used to coat the edge 246 and provide a low friction surface. Lines lying parallel with the film elongation direction and lying within the planes defining the film surface on the upstream and downstream sides of the edge make an angle 2α with respect to one another, this angle being subtended by a plane passing through the edge. As a result an angle α exists between the upstream film plane and the edge plane and similarly an angle α exists between the edge plane and the downstream film plane. On the downstream side of the edge a further pair of tensioning rollers 250 and 251 on opposing sides of the film ensure that the film is kept under tension and therefore forced against the edge 246.

The application of a tensile stress within the film 230 caused by the rollers 240, 241, 250, 251 causes a retarding force upon the cover film 236 which is adjacent the edge in comparison with that of the cover film 235 which is distal from the edge. Thus a shear force is applied in the plane of the cover film 236 at the position of the edge and in a direction of elongation of the film sandwich 230. The small radius of curvature at the edge 246 forces the proximal and distal surfaces of the film (with respect to the edge) to experience a different path length The adhesion between the cover film and the photonic crystal material to which it is attached transmits the shear force to the material and causes local rearrangement of the polystyrene spheres within it. This enhances the local crystallinity and thereby increases the ordering which in turn results in an improved optical effect.

The resultant optical effect (second optical effect) caused by the shear process is, in practice, quite dramatic. In some cases where a visible optical effect is produced by the extrusion process, the shear process caused by the edge may significantly strengthen the effect, causing it to be substantially enhanced.

It will be appreciated that the temperature of the edge 246, together with the local profile of the edge, the angle 2α and the force applied by the rollers 240, 241, 250, 251 may be altered in accordance with the type of material and its thickness.

Returning to FIG. 1, the passage of the film between the nip of the rollers 240, 241 is shown at step 112 where the film is gripped and tension applied. Thereafter, at step 114 the heating and shearing process is applied by the edge 246. At step 116 the film is once again gripped by the rollers 250, 251 and at step 118 additional processing steps may be applied downstream.

It will be recalled that one of the factors in the selection of materials to use in the process was a consideration of their ability to cross-link. One such downstream process at step 118 may be a cross-linking process such as thermal cross-linking or cross-linking via application of additional chemicals or radiation such as ultraviolet light. In the present example however, the film is cross-linked due to the heating process applied by the edge 246 and thereafter over time as it cools or even remains at ambient temperature for extended periods. Another such further process is the removal of one or each of the PET films and it will be appreciated that certain types of cross-linking may require direct access to the surface of the film without the PET cover layer being present.

Although FIG. 2 shows the provision of a single heated edge 246 using a plate 245, it will be appreciated that multiple edges may be used in which subsequent edges may be brought into close contact with the same surface or opposing surfaces, for example in an alternating manner. It is also contemplated that the film may be passed two or more times over a single or multiple edges. This may be achieved by reversing the direction of travel of the film one or more times (for example in a "to-and-fro" manner). It will be appreciated that, whilst relatively short "non-continuous" lengths of film may be treated in this way, the same process can also be applied to continuous films by treating discrete length sections of the film sequentially which may be effected by the use of guides or rollers whose position is moveable thereby changing the local film path length.

The cover films provide a number of beneficial qualities to the process. They firstly provide a strengthening effect in that they provide additional support to the film as it is thinned by the calender rollers 220, 221. They also provide protection for the film as it is passed through the downstream rollers and over the edge for example. Another beneficial effect is that the adhesion between the cover film and the photonic crystal film allows a more even distribution of the shear stress thereby providing a homogenous application of the force across the width of the film. This assists greatly in providing a homogeneous optical effect.

Whilst the cover films provide these benefits, in some cases the initial film 215 has sufficient strength and mechanical properties to be processed without either one or each cover film, if desired. The details of the processing are essentially the same as those with the cover film and in this case it will be appreciated that the surface properties of the photonic crystal film do not cause adverse effects when in contact with the rollers, edge or any other means for producing the shear process.

A great benefit of the method and apparatus described in connection with FIGS. 1 and 2 is that the film can be produced essentially continuously and also have similar optical properties throughout.

Figure 3:
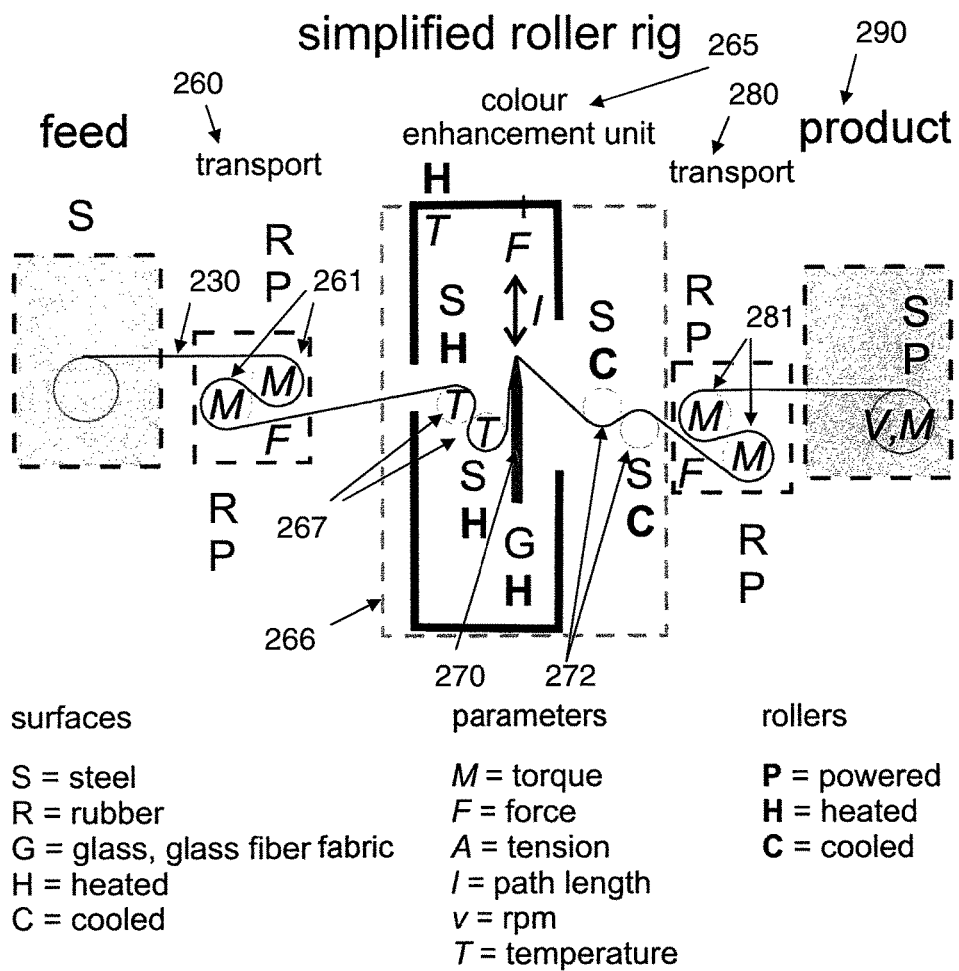
FIG. 3 shows an example colour enhancement unit.

Firstly, FIG. 3 shows a more detailed arrangement of the right hand side of FIG. 2, downstream of the rollers 220, 221. The apparatus to the left of FIG. 2 is generally represented in FIG. 3 by the left hand apparatus entitled "feed". In FIG. 3, the surfaces of the various components such as rollers which the film contacts are described by various letters, these being as follows: steel (S), rubber (R), glass or glass fibre fabric (G), heated (H) and cooled (C). Various parameters of the components are likewise denoted by letters: torque (M), force (F), tension (A), revolutions per minute (V) and temperature (T). The rollers are described in the following terms: powered (P), heated (H) and cooled (C).

With reference to the left hand section marked "transport" 260 the film is firstly fed, following leaving the rollers 220, 221 in FIG. 2 around two tensioning rollers which perform the function of rollers 240, 241 in FIG. 2. In FIG. 3 these rollers are indicated at 261 and the letter M denotes the torque applied to the rollers which generates tension within the film. Each of these rollers has a rubber surface and is powered. Upon leaving the first transport section 260, the film 230 then passes into the colour enhancement unit 265. This includes a heated chamber 266 into which the film 230 passes. This is then passed around the surfaces of two adjacent rollers indicated at 267 (in a half-figure-of-eight path). Each of these rollers is heated (denoted by the letter H) and has a surface formed from steel. The steel provides good transfer of the heat to the film. The film then passes, whilst remaining in the chamber 266, over a sharpened edge of the heated plate 270. This is also heated (denoted by H) and in this case comprises heated glass with a glass fibre fabric edge over which the film 230 is passed. The film 230 then exits the chamber and passes around the surfaces of two adjacent rollers 272 (again in a half-figure-of-eight path), these again being formed of steel and this time being cooled rollers so as to reduce the temperature of the film.

The cooled film then passes into a second transport section 280 which, in a similar manner to the section 260 is equipped with two adjacent rollers 281 about whose surfaces the film is entrained. These rollers again are powered and have rubber surfaces so as to grip the film. They apply torque (indicated by M) and therefore provide a force indicated by F to the film. The powered rollers of the transport sections 260, 280 provide a tensioning force within the film and ensure that it is driven against the sharp edge provided by the plate 270.

Downstream of the second transport section 280, the film enters the product section 290 where it is wound around a steel powered roller.

Characterisation of Optical Effect

The spectra of experimental films having PET cover layers and undergoing a shearing process can be investigated using spectrometry. An example of a suitable transmissive spectrometer is a Perkin Elmer Lambda 40 spectrometer. In the present case this spectrometer was used to characterise the examples. Two sets of irradiation directions were chosen, one set being in a plane defined by axes in the elongate direction of the film and the normal to the film (denoted "parallel"), and the other being in a plane parallel to the transverse direction of the film and the normal direction to the film (denoted "normal"). In each case, an angle $\Phi$ is defined, this being the angle between the beam within the respective plane and the plane of the film itself. This is shown in FIG. 4.

The measurements described took into account the individual spectra of the two PET layers which were first measured separately.

FIGS. 5a and 5b show respectively the absorption spectra in the parallel (FIG. 5a) and normal (FIG. 5b) arrangements for Sample 1. The spectra were taken upon a film following a calendering process (such as having immediately passed through the rollers 220, 221 of FIG. 2) and prior to any colour enhancement step. It will be noted that the absorbent spectra in each case exhibits some reduction of general gradient around a wavelength of about 500 nanometres, but in each case there is no easily identifiable peak. This therefore represents the first optical effect. FIGS. 6a and 6b show the equivalent spectra for films having passed through the colour enhancement unit and therefore having been subjected to the shearing process. In each case, a strong peak is visible between about 500 and 600 nanometres (this representing the second optical effect). Furthermore, the position of the peak shifts as a function of the incidence angle $\Phi$. This is as predicted by Bragg, the peaks travel in the direction of the smaller wavelengths with decreasing angles of $\Phi$. This angular dependency demonstrates that the second optical effect in this case is an optically variable effect.

FIG. 7 shows a comparison between the spectra after the rolling process and prior to colour enhancement, and after the colour enhancement process.

The spectra demonstrate that a strong angularly dependent colour effect is provided in each of the normal and parallel illumination directions. Although not easily discerned from the FIGS. 6a and 6b, the form and position of the peaks in FIGS. 6a and 6b demonstrate that a different colour effect is achieved as a result of illumination at any particular angle in the parallel direction when compared with the normal direction. Thus, two of the colour effects are not only angularly dependent with respect to angle of incidence, they are also angularly dependent with respect to rotation angle about the normal of the film.

Similar measurements were also taken in reflection rather than in transmission and equipment in the form of an Ocean Optics USB4000 spectrometer was used for this purpose. The films were found to demonstrate a strong reflective colour effect and, despite the transparency of the films, the colour of any substrate beneath the films was found to have only limited effects upon the strong Bragg colours provided by the film, as is demonstrated in FIGS. 8a and 8b which relate to the position of the Bragg peak with a film having a black support (FIG. 8a) and a white support (FIG. 8b). Thus can be seen, an angle of incidence shifting from 45 degrees to 75 degrees causes a shift in the Bragg peak by 65 nanometres. This in practice causes a colour change from orange-red at the 75 degrees position to a bluish-green at 45 degrees. It should be noted that the angles described are measured between the light source and the film plane. The detector is therefore placed in the symmetrical position at the angle 180 degrees minus θ. The symmetrical arrangement did therefore include a contribution from the surface gloss. Measurement at off-gloss angles shows that the film actually reflects the colour into an angle cone surrounding the gloss angle. FIG. 9 illustrates the effect of off-gloss angles and even at an angle of about 70 degrees off the gloss angle, a notable peak can still be seen in FIG. 9.

As has been demonstrated, the film production method of the present invention provides a strong photonic optical effect in photonic material films by the application of a shear process. This has numerous potential applications, including incorporation as a security device to reduce counterfeiting, since similar optical effects are extremely difficult to replicate by known processes.

Some examples of the incorporation of photonic crystal material films into security devices and documents are now discussed. Each of the examples now described refers to two regions of photonic crystal material, these being denoted Region A and Region B. In each example the intention is to describe two different alternative situations. The first is that Region A and Region B are identical and therefore interchangeable such that the material in each of Regions A and B is formed from the photonic material film discussed earlier. The second alternative is that Regions A or B have different properties. This might be because, during the extrusion process, the component materials and/or the processing are modified as a function of time, and/or across the dimension of the film. As a further alternative, or addition, a further process may be applied to part of the film (such as a localised thermal and/or mechanical process) to modify the material properties. Regions A and B may also be distinct because they represent cut-out parts of different films, applied separately.

Figure 10:
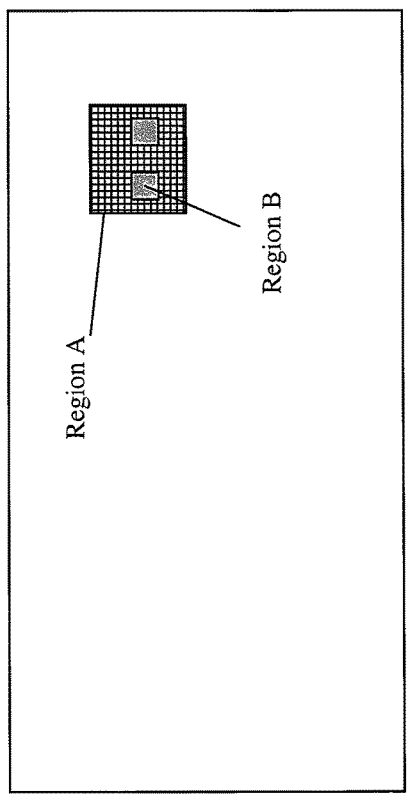
FIG. 10 shows a first example of a security document in plan view.
Figure 11:
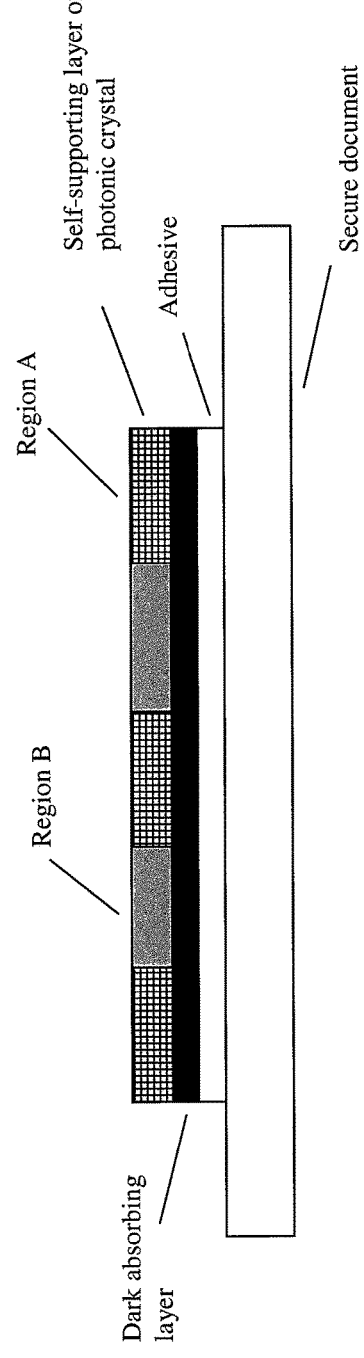
FIG. 11 shows the first example document in section.

FIG. 10 shows a security device formed using a film of the current invention incorporated into a security document, as a surface applied patch. FIG. 11 shows a cross-sectional view of the patch on the document in FIG. 10. The device comprises parts of self-supporting photonic crystal films in the form of two Regions A and B, onto which is applied a dark absorbing layer. An adhesive layer is applied to the outer surface of the device on the dark absorbing layer to adhere it to the secure document. Regions A and B exhibit different optically variable effects, since each region was produced using material from a different film. Region A has an angular dependent colour variation in response to incident light. For example the angular dependent colourshift in Region A can be from red, when viewed at a relatively high angle of incidence, for example 70°, to the plane of substrate, to green when viewed at a more oblique angle of incidence, for example 45°, to the plane of the substrate. In contrast the angular dependent colourshift in Region B can be from green, when viewed at 70° to the plane of substrate, to blue when viewed at 45° of incidence to the plane of the substrate.

One or both of the regions A and B are preferably in the form of a design. In the case of complex designs, one of the regions may be formed by a deformation process (such as stamping) in which case the relevant region may not be optically variable. Preferably the designs are in the form of images such as patterns, symbols and alphanumeric characters and combinations thereof. The designs can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic.

Figure 12:
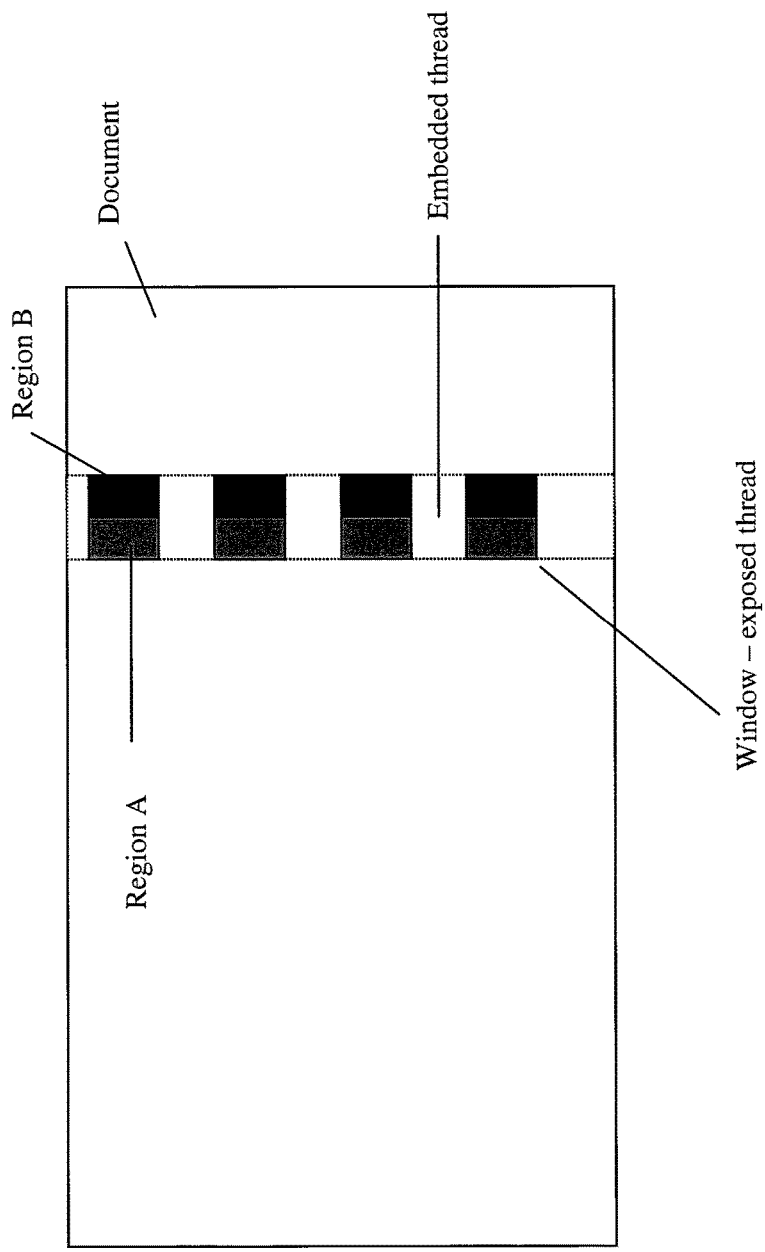
FIG. 12 shows an example security document having a windowed thread.
Figure 13:
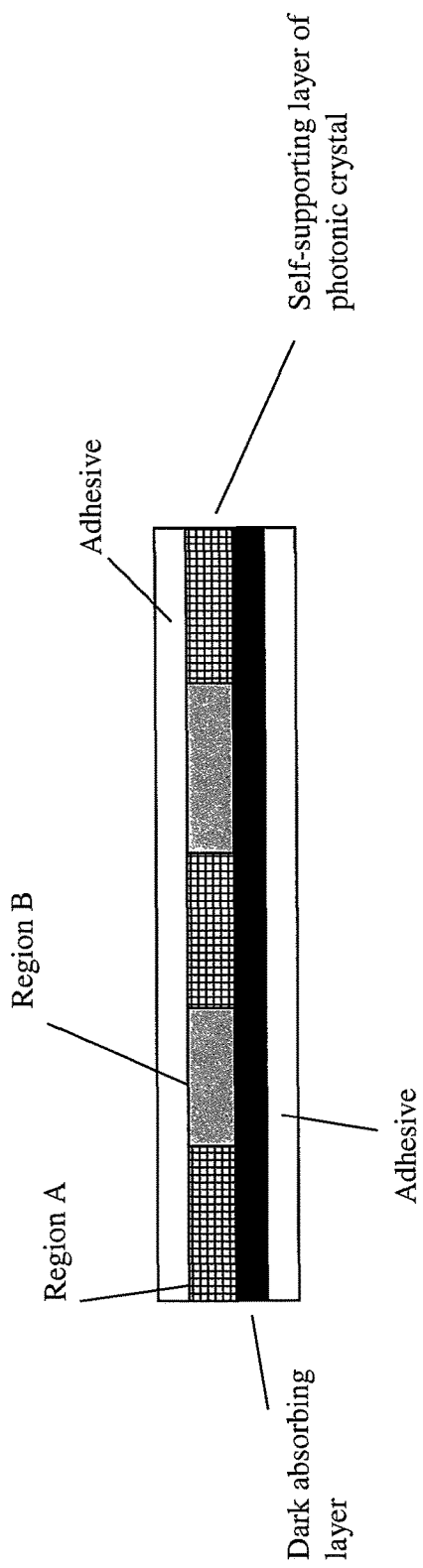
FIG. 13 shows the second example document in section.

FIG. 12 shows an example security device using a film of the current invention incorporated into a security document as a windowed thread with windows of exposed thread and areas of embedded thread. The thread comprises longitudinal bands, corresponding to Regions A and B, which exhibit different angular dependent colour variations. The bands are formed in the photonic crystal film by varying the sphere size of the polymer system during the extrusion process. FIG. 13 shows a cross-sectional view of one example of the current invention suitable for application as a windowed security thread. The device comprises a self-supporting photonic crystal film, comprising regions A and B, onto which is applied a dark absorbing layer. An adhesive layer may be applied to the outer surfaces of the device to improve adherence to the secure document.

Figure 14:
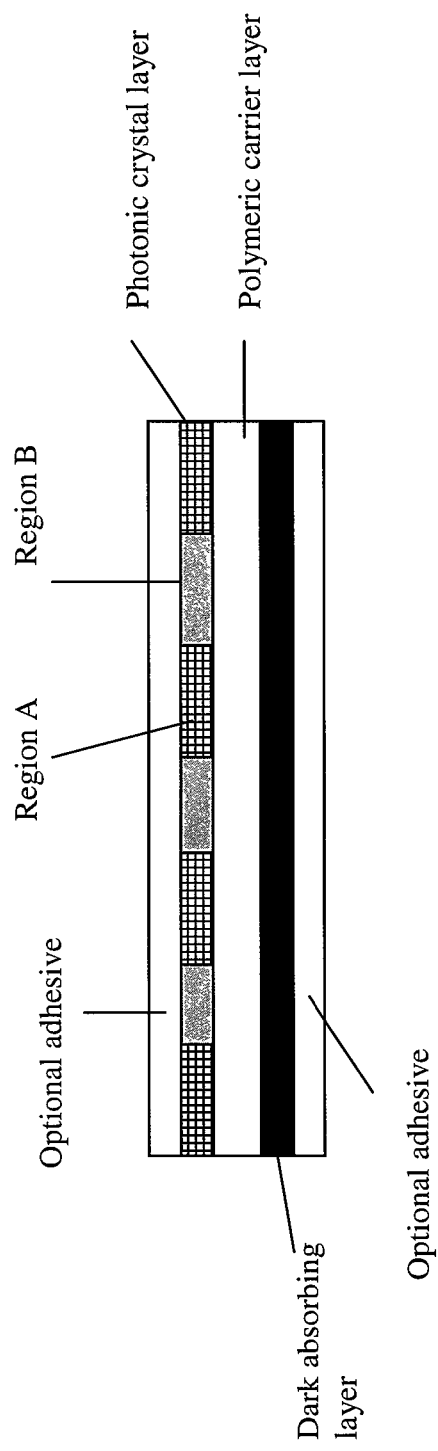
FIG. 14 shows a third example document in section.

In an alternative structure to that shown in FIG. 13, and illustrated in FIG. 14, the security device comprises a polymeric carrier substrate, for example Polyethylene Terephthalate (PET) or Bi-axially Oriented Polypropylene (BOPP), onto which is applied a dark absorbing layer. A layer of photonic crystal material, comprising contrasting optically variable Regions A and B, is then applied to the opposite surface of the carrier film, or alternatively on to the dark absorbing layer. The photonic crystal layer is formed as a separate film and then laminated to the carrier substrate. This is particularly beneficial when the carrier substrate for the security thread comprises additional security features, such as magnetic layers and metallised layers comprising demetallised characters, which may not be suitable to be applied directly to the photonic crystal layer. An adhesive layer may be applied to the outer surfaces of the device to improve adherence to the secure document.

The fact that the security device in FIGS. 12, 13 and 14 is in the form of a windowed security thread is for illustration only and the photonic crystal material could just as easily be employed as part of a surface applied security feature such as a stripe or a patch.

The examples described in FIGS. 12 to 14 are viewed primarily in reflection and as such the optical effects of the photonic crystal material are best visualised against a dark non-selectively absorbing background. This can be achieved by placing an absorbing layer under the photonic crystal layer or by the introduction of absorbing particles into the photonic crystal materials.

Whilst the use of a black, or very dark, substantially totally absorbing layer may give rise to the most strong colourshifts, other effects may be generated by the use of a partially absorbing layer of other colours or a combination of colours, giving rise to differing apparent colourshift colours. The absorbing layer may comprise a pigmented ink or coating or alternatively a non-pigmented absorbing dye can be used.

Security devices comprising photonic crystal materials are inherently machine-readable due to the wavelength selectivity of the photonic crystal materials. In further examples the machine readable-aspect of the current invention can be extended further by the introduction of detectable materials in the photonic crystal or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

In one preferred embodiment, the pigment in the separate absorbing layers is machine-readable, for example carbon black, to produce a machine-readable, conducting or IR absorbing layer. Alternatively it may be a magnetic material, such as magnetite, to produce a machine-readable magnetic layer.

The security device incorporating the film of the current invention could be used in combination with existing approaches for the manufacture of security thread. Examples of suitable methods and constructions that can be used include, but are not limited to, those cited within WO03061980, EP0516790, WO9825236, and WO9928852.

Figure 15A:
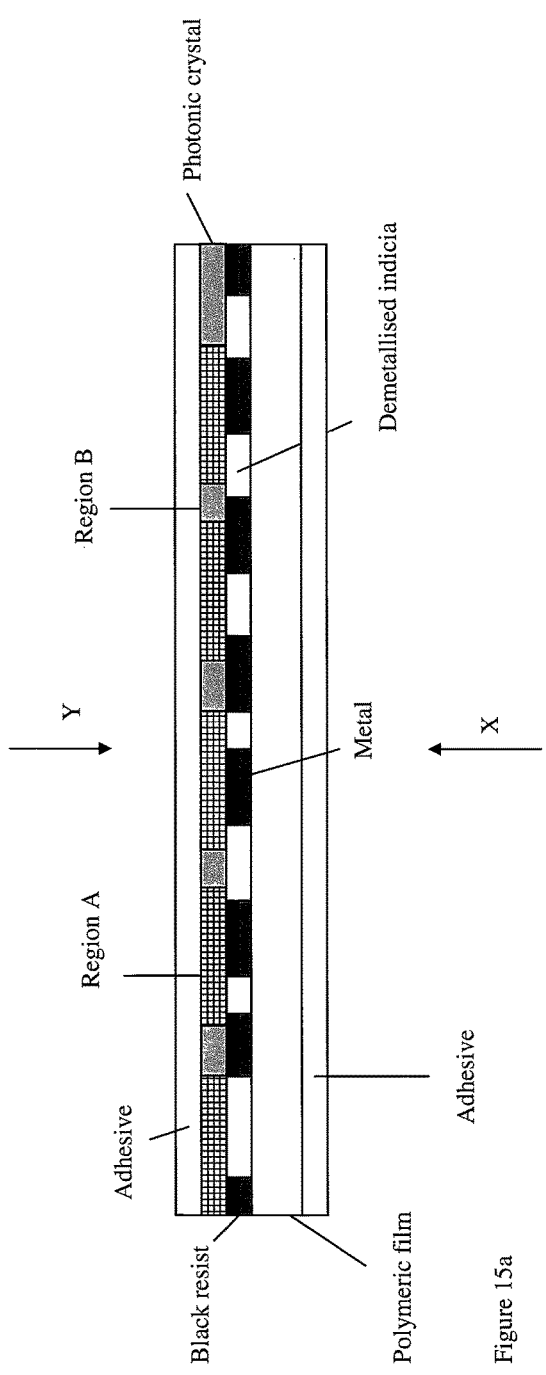
FIG. 15a shows a fourth example document including demetallised characters.

FIG. 15a illustrates how the current invention can be combined with demetallised characters for application as a windowed security thread. The method requires a metallised film comprising a substantially clear polymeric film of PET or the like, which has an opaque layer of metal on a first side thereof. A suitable pre-metallised film is metallised MELINEX S film from DuPont of preferably 19 µm thickness. The metal layer is printed with a resist which contains a black or dark dye or pigment. Suitable resists include the dye BASF Neozapon X51 or the pigment (well dispersed) "Carbon Black7" mixed into a material with both good adhesion to metal and caustic resistance.

The printed metallised film is then partially demetallised, according to a known demetallisation process using a caustic wash which removes the metal in the regions not printed with the resist. The remaining regions coated with resist provide a black layer which is visible when the demetallised film is viewed from its first side (along arrow Y) interspersed with clear regions. The shiny metal of the remaining parts of the metallic layer are only visible from an opposite side of the demetallised film (along arrow X). The resist may be printed in the form of the indicia such as words, numerals, patterns and the like; in which case the resulting indicia will be positively metallised, with the metal still covered by the dark or black resist. Alternatively the resist may be printed so as to form indicia negatively, in which case the resulting indicia will be provided by the demetallised regions. The indicia however formed, are clearly visible from both sides, especially in transmitted light, due to the contrast between the regions of the metal which have been removed and the remaining opaque regions. The photonic crystal film is then applied.

The security device illustrated in FIG. 15a exhibits two visually contrasting security characteristics. The device comprises the optical effects of the photonic crystal layer, as described for the previous examples, when the finished substrate is viewed in reflection from the first side (along arrow Y); and a metallic shiny partial coating when viewed from the other side (along arrow X). Additionally clear positive or negative indicia, defined by the black resist, can be seen in transmission from either side. This example is particularly advantageous when used in a device that is viewable from both sides of the document in which it is incorporated. For example the device could be incorporated into a secure document using the methods described in EP1141480 or WO03054297.

Figure 15B:
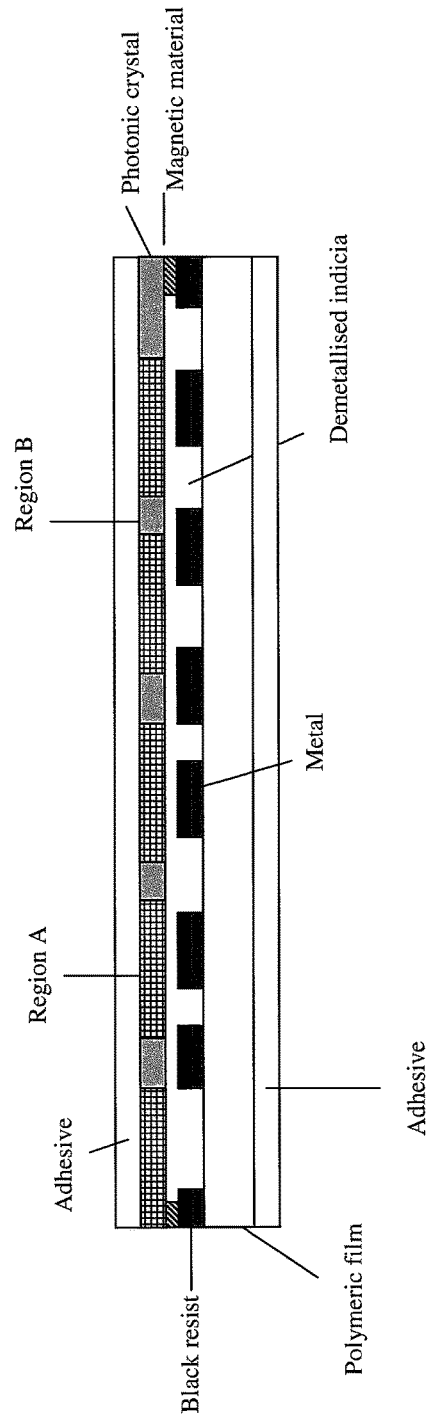
FIG. 15b shows a machine-readable version as a fifth example document.

FIG. 15b illustrates a machine-readable version of the device illustrated in FIG. 15a. The device comprises a metallised PET base layer demetallised with a suitable design including tramlines of metal left along each edge of the device. As described with reference to FIG. 15a a black resist is used during the demetallisation process. A protective layer may be applied onto the metal tramlines (not shown in FIG. 15b) to prevent the metal from being corroded by the magnetic layer, which is applied next. A suitable protective layer is VHL31534 supplied by Sun Chemical applied with coat weight of 2 gsm. The protective layer may optionally be pigmented. The magnetic material is only applied over the metal tramlines so as not to obscure the demetallised indicia. The photonic crystal film layer is then applied. An adhesive layer may be applied to the outer surfaces of the device to improve adherence to the security document.

When a magnetic material is incorporated into the device either within the absorbing layer or as a separate layer the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

Figure 16:
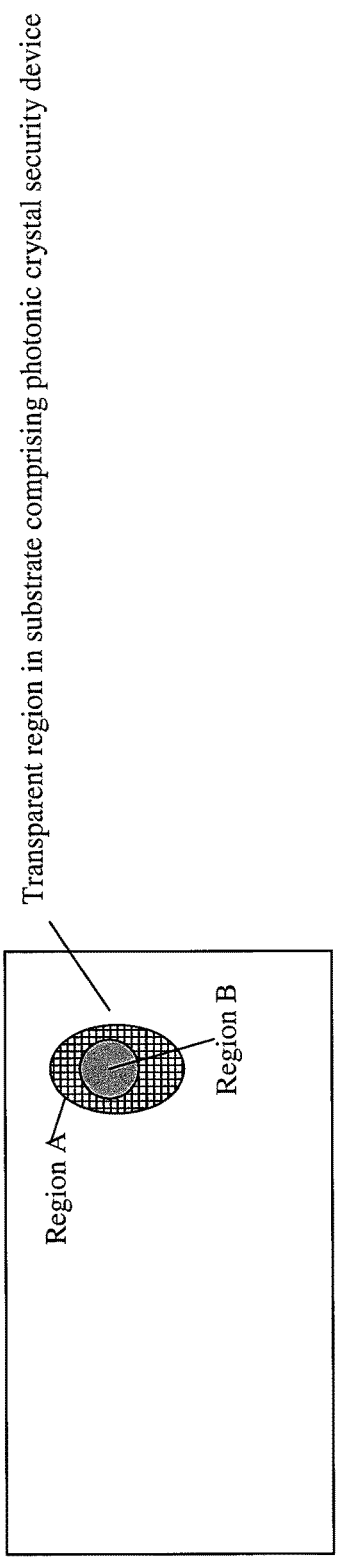
FIG. 16 shows a sixth example document having a transparent region.
Figure 17A:
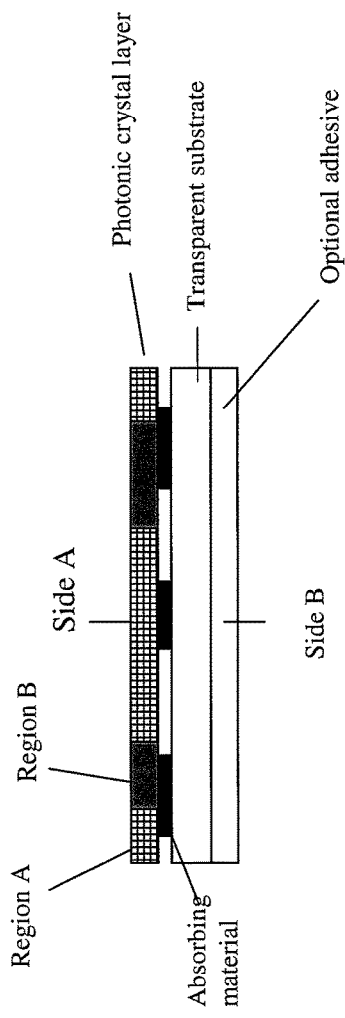
FIG. 17a shows a seventh example document in section.

FIG. 16 shows the film of the current invention incorporated into a transparent region of a security document. FIG. 17a shows a cross-sectional view of the security device within the transparent region. The security device comprises a transparent carrier layer, which preferably forms the transparent region of the substrate. An absorbing material is applied to the transparent layer in localised regions to form a recognisable pattern or identifying image. A layer comprising a film of photonic crystal material, comprising two Regions A and B, exhibiting the same optical characteristics as the Regions A and B in FIGS. 12 and 13, is located above the absorbing layer.

Figure 18:
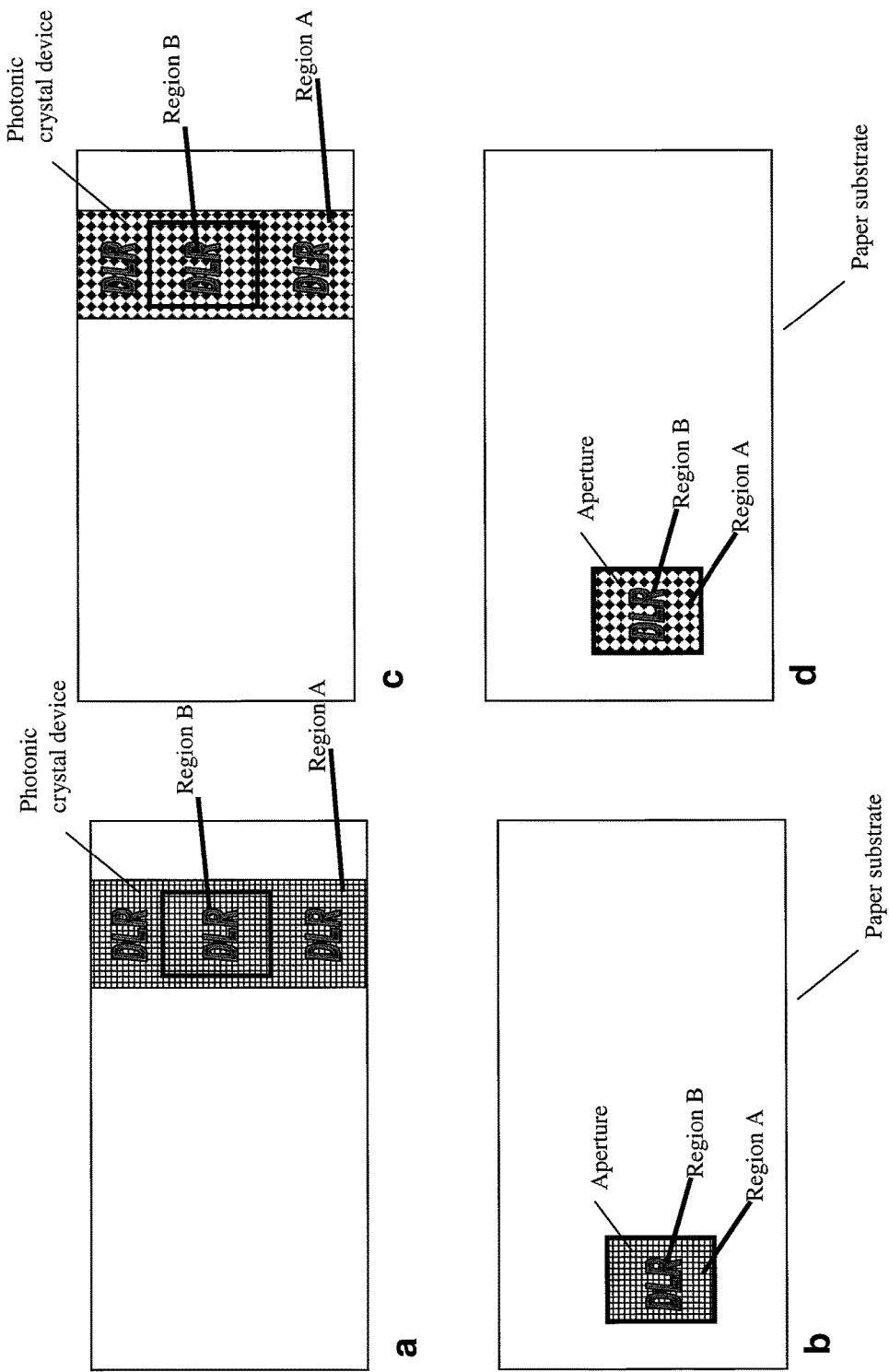
FIGS. 18a to 18d show an eighth example document having an aperture in a paper substrate when viewed from different angles.

When the device in FIG. 18 is viewed in reflection from side A, two different highly contrasting colourshifting regions are observed in Regions A and B, from the areas of the photonic crystal layer located above the absorbing layer, as the device is tilted. For example in Region A the colourshift can be from red, when viewed at one angle of incidence to the plane of substrate, to green when viewed at a more oblique angle of incidence to the plane of the substrate. In Region B a different colourshift will apply, over the same angular range, for example green to blue. In the regions not above the absorbing layer the transmitted colour saturates the reflective colour. The transmitted and reflected colours are complementary, for example, a red to green colourshift in reflection is seen as a cyan to magenta colourshift in transmission.

Figure 17B:
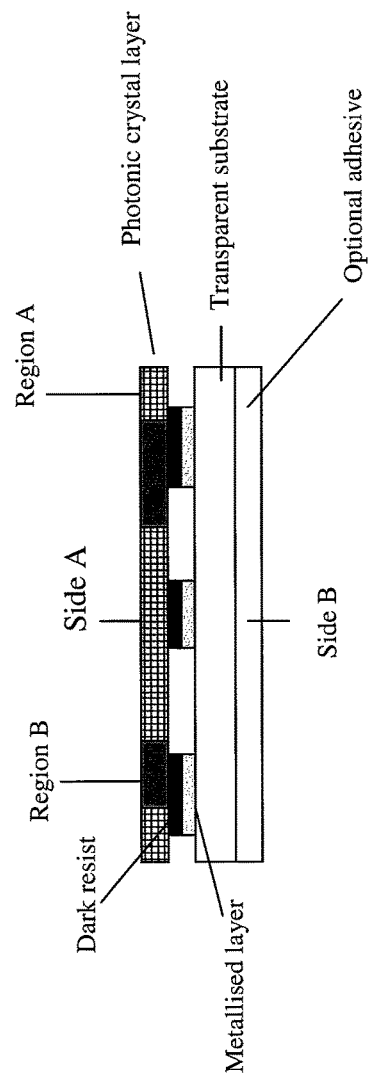
FIG. 17b shows a machine-readable version of the seventh example document.

When the device in FIG. 17a is viewed in reflection or transmission from side B the dark absorbing layer will be visible in the form of an identifying image. If a dark image is not aesthetically acceptable then a more aesthetically pleasing material/colour could be used to conceal the dark layer such that it is not viewable from side B. For example the dark absorbing areas could be overprinted on side B of the transparent region with differently coloured opaque inks or metallic inks. Alternatively the transparent carrier substrate could be replaced with a metallised polymeric substrate, as illustrated in FIG. 17b. The metallised substrate is printed with a dark resist, as discussed with reference to FIG. 15a, in the form of the identifying image. The printed metallised film is then partially demetallised removing the metal in the regions not printed with the resist. When viewing from side A the photonic crystal film is viewed against the absorbing dark resist and appears as described with reference to FIG. 17a, but when viewing from side B a metallic image is observed of the identifying image printed with the dark resist. The image could be positive, i.e. defined by the metallic regions, or negative, i.e. defined by the transparent regions between the metallic regions. As mentioned earlier, each of Region A and Region B may be identical and formed from continuous film or cut-out sections thereof, rather than exhibiting different optical effects.

In an alternative machine-readable construction the dark resist in FIG. 17b can be formed using a magnetic pigment, for example magnetite to provide a machine-readable code. In a further embodiment, only part of the dark resist is provided with a magnetic pigment and the remainder is provided with a non-magnetic pigment. If both the magnetic and non-magnetic regions are substantially totally absorbing there will be no visual difference in the photonic crystal film over the two regions and therefore the format of the code will not be readily apparent.

FIG. 18 illustrates an example where the film of the current invention is incorporated into an aperture of a paper substrate. A self-supporting photonic crystal film is incorporated into a paper substrate as described in EP1141480. One side of the photonic crystal film is wholly exposed on the front surface of a paper substrate in which it is partially embedded (FIGS. 18a and 18c), and partially exposed in one aperture on the rear surface of the substrate (FIGS. 18b and 18d). In this example carbon nanoparticles have been incorporated into the photonic crystal structure.

The photonic crystal film comprises two regions A and B. Region A appears red when viewed at one angle of incidence to the plane of the substrate and shifts to green when viewed at a more oblique angle of incidence to the plane of the substrate. Region B is a non-opalescent region due to an area of disorder in the photonic crystal structure (for example caused by deforming a region of the film following its formation) and its appearance remains constant at any viewing angle. In this example Region A forms the background and Region B forms the identifying image "DLR".

On viewing the device at one angle of incidence to the plane of substrate, for example 70°, Region A appears red and the non-opalescent identifying image "DLR" is visible against the red background (FIGS. 18a and 18b). On tilting to a more oblique angle of incidence, for e.g. 45°, the colour of Region A shifts from red to green but the appearance of Region B remains the same and therefore the identifying image "DLR" is visible against the green background (FIGS. 18c and 18d). This effect is visible from both sides of the security document.

The use of the self-supporting photonic crystal film doped with carbon nanoparticles enables the reflective colourshifting effect to be visible from both sides of the document while using just a single layer of colourshifting material. On viewing the device from the rear of the document in reflection, illustrated in FIG. 18b, the same optical properties in Regions A and B, as is observed from the front of the document, is present where the photonic crystal film is exposed in the aperture.

In an alternative embodiment to that referenced in FIG. 18 the photonic crystal film can be supported by a carrier layer to facilitate its incorporation into the paper document. The photonic crystal layer is formed as a separate film (including the application of shearing) and then laminated to the carrier substrate. The carrier substrate may comprise additional security features including de-metallised designs, holographic designs in combination with a highly reflective layer such as a metallic layer or a thin transparent layer of a high refractive index material (for example ZnS), printed indicia, luminescent or magnetic materials, and coarse embossing with a security design that may be either blind embossed to produce a tactile/visible feature or could include printing inks to further enhance visibility. In this manner a different security feature can be observed on either side of the security device.

In a further embodiment a security device can be constructed such that different colourshifting effects are observed on either surface of the security device. This can be achieved by laminating together two photonic crystal films with different optical characteristics or by varying the optical characteristics of the photonic crystal film over the thickness of the film.

Different colourshifting effects on either surface of the security device can also be generated using a single layer of photonic crystal film by locally varying the optical characteristics of the photonic crystal film over the thickness of the film. For example the sphere size can be varied through the thickness of the film. This variation can be introduced by controlling the assembly of the spheres during the formation of the photonic crystal film. Alternatively if the film is manufactured by polymer extrusion then two polymer mixes, comprising the spheres and the matrix, can be generated with different sphere sizes. The two polymer mixes can then be co-extruded into a single polymer film forming a crystal structure where there is a step change in sphere size at an interface in the centre of the film.

Regions with different optical characteristics across the film are particularly useful for inclusion in thicker security devices (>100 μm) which might be employed as layers in card based documents such as a credit cards, debit cards, identity cards and driving licences.

The security devices described may be further customised in order to increase the difficulty in counterfeiting and/or provide identifying information. The customisation process can take place before or after the device is incorporated into the document. In one example the customisation of the security device occurs by applying printed information to the photonic crystal film. The photonic crystal film may be printed with images using any of the conventional printing processes such as intaglio, gravure, ink jet, offset lithography, screen, dye diffusion and flexography. The print may be applied as a single print working in a single colour or as multiple print workings in multiple colours.

In a preferred embodiment the images are printed partly on the photonic crystal film and partly on the substrate the device is incorporated into, such that the design continues uninterrupted between the two surfaces. In a further embodiment, one of the colours of the printed images matches one of the switching colours of the photonic crystal film. For example if one of the regions of the photonic crystal film switches from red to green on tilting the device in a specific viewing direction then any red printed information over this region will be substantially invisible at certain angles of incidence but becomes visible as the sample is tilted and the static red of the printed information contrasts with the green of the optically variable photonic crystal film. In this manner a latent image security feature can be created.

As an alternative to the printing of ordinary coloured inks, it is also possible to print functional inks. By functional inks we mean inks that react to an external stimulus. Inks of this type include but are not limited to fluorescent, phosphorescent, infrared absorbing, thermochromic, photochromic, magnetic, electrochromic, conductive and piezochromic.

As well as functional inks, it is also possible to print onto the photonic crystal film with other optical effect inks. Optical effect inks include OVI® and Oasis® marketed by Sicpa. Other optical inks include inks containing iridescent, iriodine, pearlescent, liquid crystal and metal-based pigments.

In a further embodiment non-opalescent regions are created by mechanically deforming the photonic crystal film. The mechanical deformation is preferably carried out using an embossing or hot stamping process. Preferably the embossing process takes place during the intaglio printing process and is carried out using an intaglio plate. FIG. 19 shows an example of a security substrate comprising a security device where the photonic crystal film has been customised by hot stamping the film after it has been applied to the base substrate. In this example the photonic crystal film has been incorporated into a paper substrate in the same manner as referenced in FIG. 18 and described in EP1141480. FIG. 19 shows the front surface of the paper substrate on which the device is wholly exposed. The device is also exposed on the back surface in the aperture region. In this example the photonic crystal film exhibits a red-green colourshift on tilting the device to an oblique angle of incidence. An image of the numeral "5" is hot stamped into the photonic crystal film such that the order of the photonic crystal is distorted in the stamped region. The disorder in the crystal results in the stamped regions becoming non-opalescent at all angles of view. On tilting the document the numeral "5" remains non-opaslescent but the non-stamped regions change from red (FIG. 19a) to green (FIG. 19b).

In a further embodiment, the customisation of the security device occurs by embossing the photonic crystal film with raised line structures. The embossing of raised line structures into photonic crystal films is particularly advantageous because the facets generated by the embossing result in a change in the angle of incidence of the incoming light, generating facets of differing colours due to the fact that the colour of the photonic crystal film is dependent on the angle of view. The use of a raised line structure with an photonic crystal film has two secure aspects; firstly the optically variable feature generated by the line structure and secondly the creation of localised regions exhibiting different colourshifts from the background film.

For example if the photonic crystal device exhibits a green to blue colourshift on tilting the device away from normal incidence then when viewed at normal incidence the embossed and non-embossed regions will appear green. On tilting the device the non-embossed and embossed regions will change from green to blue at different angles of view as the device is tilted.

A further advantage of using embossed raised line structures is that the structures have a raised surface that can be identified by touch. The smooth surface of the photonic crystal film further enhances the tactility of these raised structures.

The embossed line structures can take any convenient form including straight (rectilinear) or curved such as full or partial arcs of a circle or sections of a sinusoidal wave. The lines may be continuous or discontinuous and, for example, formed of dashes, dots or other shapes. By other shapes we mean the dots or dashes could have a graphical form. The line widths are typically in the range 10-500 microns, preferably 50-300 microns. Preferably, the individual lines are barely visible to the naked eye, the main visual impression being given by an array of multiple lines. The lines can define any shape or form, for example square, triangle, hexagon, star, flower or indicia such as a letter or number.

The embossed line structures are preferably formed by applying an embossing plate to the photonic crystal film under heat and pressure. Preferably the embossing process takes place during the intaglio printing process and is carried out using an intaglio plate having recesses defining the line structures. Preferably the photonic crystal film is blind embossed, i.e. the recesses are not filled with ink. However it is also possible that some of the recesses defining the embossed structure may be filled with ink and others left unfilled. Further intaglio printing or blind embossing may be carried out on regions of the substrate adjacent to the security device using the same intaglio plate so as to achieve precise registration between the different regions.

Figure 20:
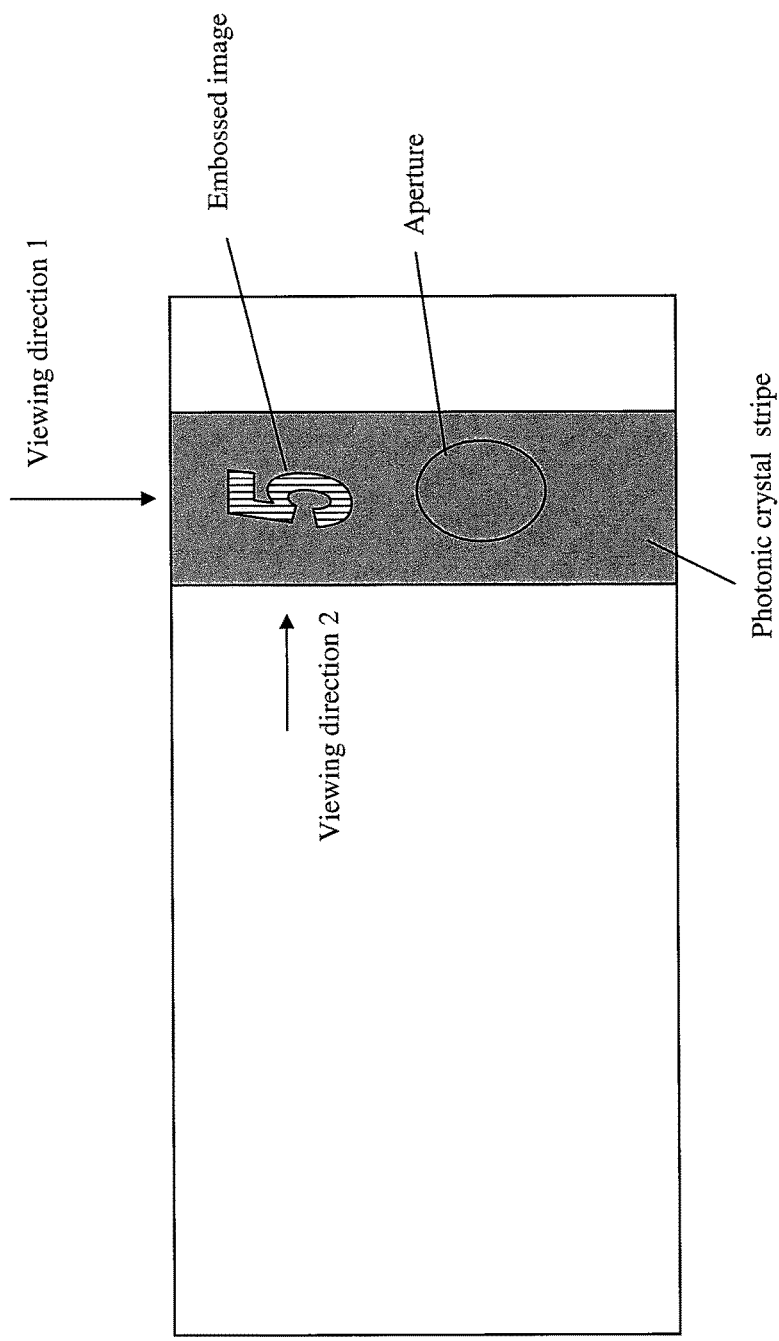
FIG. 20 shows an embossed tenth example document.

FIG. 20 shows an example of a security substrate comprising a security device where the photonic crystal film has been customised by embossing the film after it has been applied to the base substrate. In this example the photonic crystal film has been incorporated into a paper substrate in the same manner as referenced in FIG. 18 and described in EP1141480. FIG. 20 shows the front surface of the paper substrate on which the device is wholly exposed. The device is also exposed on the back surface in the aperture region. In this example the photonic crystal film exhibits a red-green colourshift on tilting the device to an oblique angle of incidence and viewing along viewing direction 1 and a green-blue colourshift on tilting the device to an oblique angle of incidence and viewing along viewing direction 2. The embossed line structures, formed by a respective set of substantially parallel raised lines, define the numeral "5".

On viewing the substrate along viewing direction 1 at a relatively high angle of incidence, for example 70° to the plane of the substrate the non-embossed regions appear red but the embossed regions appear green due to the dominant reflected light arising from the edges of the raised lines. The difference in colour arises because the effective angle of incidence for light incident on the edge regions is greater than the angle of incidence for light incident on flat non-embossed regions. On tilting the substrate to a more oblique angle of incidence the non-embossed regions switch from red to green and the embossed regions switch from green to blue. If the device is rotated by 90°, such that it is viewed along viewing direction 2 the embossed and non-embossed regions appear substantially the same colour at a given viewing angle because very little light is reflected by the edge of the lines.

In a further embodiment the customisation of the security device occurs by embossing the photonic crystal film with a non-diffractive line structure. A non-diffractive line structure is an example of a raised line structure which produces an optically variable effect when the angle of incidence light varies, but in which this effect is not caused by interference or diffraction. Security devices based on non-diffractive line structures are known in the prior art for example WO9002658 describes a security device in which one or more transitory images are embossed into a reflective surface. WO9820382 discloses a further security device in which a group of elemental areas in which lines extend at different angles from each other form respective image pixels. U.S. Pat. No. 1,996,539 discloses a decorative device in which a relief structure is formed in a surface and has an optically variable effect. WO2005080089 discloses a security device which has segments defined by line structures in a reflective portion of a substrate, which cause incident light to be reflected non-diffractively as the angle of incidence changes.

In an alternative embodiment the security device further comprises an optically variable device such as a hologram or diffraction grating. These devices are commonly formed as relief structures in a substrate, which is then provided with a reflective coating to enhance the replay of the device. In the current invention the photonic crystal can act as the reflective coating and the relief structure can be embossed directly into the photonic crystal film or into an embossing lacquer applied onto the photonic crystal film. Alternatively localised regions of the device can be provided with a metallised layer and the relief structure subsequently embossed into an embossing lacquer on top of the metallised layer. In this manner the device comprises two laterally spaced regions one exhibiting the colourshifting properties of the photonic crystal film and one exhibiting the optically variable properties of a holographic device. Alternatively the metallic reflective coating can be replaced with a transparent reflection enhancing materials for example a thin layer of a high refractive index material such as ZnS. In this case both the colourshifting properties of the photonic crystal material and the optically variable properties of the holographic device are visible in all areas of the device although the optically variable properties of the holographic device will only be visible at certain angles of view.

In a further embodiment of the invention the security device can be customised by the application of a scattering layer to the photonic crystal film. In a preferred embodiment the scattering layer takes the form of a matt varnish or lacquer. In this context a matt varnish or lacquer is one that reduces the gloss of the photonic crystal film by scattering the light reflected from it. One example of a suitable matt varnish is a suspension of fine particles in an organic resin. The surface particles scatter the light as it passes through the varnish resulting in a matt appearance. A suitable varnish for the present invention is "Hi-Seal O 340" supplied by Hi-Tech Coatings Ltd. In an alternative solution the fine particles can be replaced by organic waxes. As a further alternative, the scattering layer can be generated by embossing a matt structure into the surface of a photonic crystal layer. Suitable embossed matt structures are described in WO9719821. The scattering layer modifies the colourshifting properties of the photonic crystal layer.

The scattering layer modifies the surface of the photonic crystal film such that the reflection is now more diffuse reducing the glare of the photonic crystal film and changing the angular range over which the respective colours of the security device are easily viewable to the authenticator. For example, if the photonic crystal material exhibits a red to green colourshift on tilting the device away from normal incidence then the switch from red to green occurs closer to normal incidence for the region with the scattering layer compared to one without a scattering layer.

Figure 21:
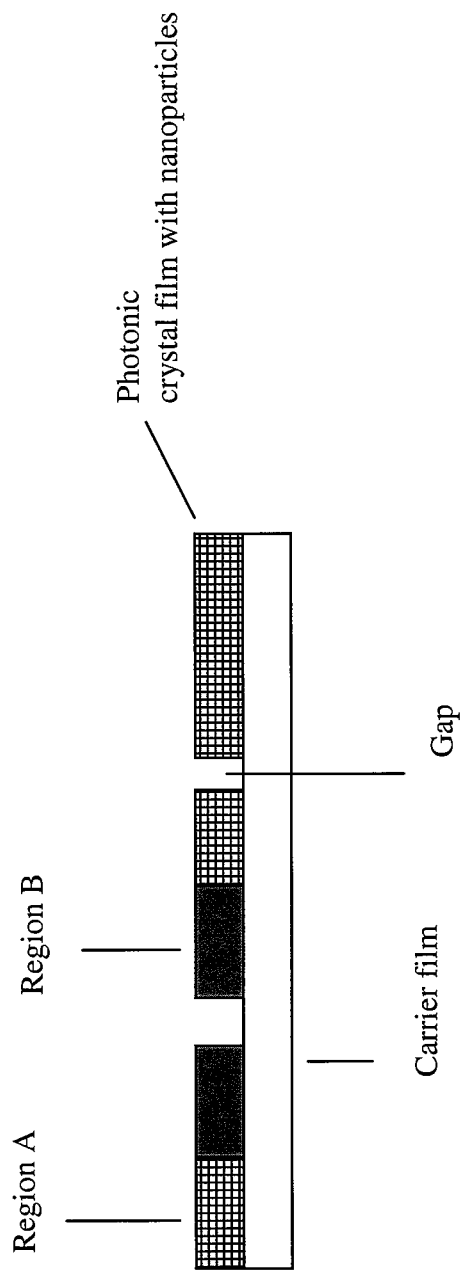
FIG. 21 shows an eleventh example document in section having gaps in the photonic film; and,
FIG. 22 shows a flow diagram of an example method of fabricating a security device.

FIG. 21 illustrates a further example where there are gaps present in the photonic crystal film. The device in FIG. 21 comprises a photonic crystal film which has been transferred onto a substantially transparent carrier substrate. Alternatively a self-supporting photonic crystal film can be used without the need for a carrier substrate. The photonic crystal film is the same as that described in relation to FIG. 18 and carbon nanoparticles have been incorporated into the photonic crystal structure to produce a substantially opaque film with an intense red colour when viewed at normal incidence. A laser is used to form gaps in the photonic crystal film in the form of an identifying image. The identifying image is clearly visible from both sides, especially in transmitted light due to the contrast between the regions of the substantially opaque photonic crystal film which have been removed and the remaining opaque regions. The security device illustrated in FIG. 21 exhibits two visually contrasting security characteristics; firstly the optical effects of the photonic crystal film and secondly the identifying image clearly visible in transmission from either side of the device.

In yet a further embodiment of the present invention, photonic crystal materials can be selected such that at certain angles of view for at least one of the Regions A and B the reflected light is in the non-visible wavelengths of the electromagnetic spectrum.

In all of the examples the designs or identifying images created by any of the layers, for example the photonic crystal film, the absorbing or customising layers, can take any form. Preferably the designs are in the form of images such as patterns, symbols and alphanumeric characters and combinations thereof. The designs can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic.

It will further be appreciated that in each of the examples described above one of the Regions A and B may exhibit an optically variable effect whereas the other region may either exhibit an optical effect in the form of an optically variable effect or a non-optically varying effect.

We now describe some examples of methods of forming an optically variable security device.

Figure 22:
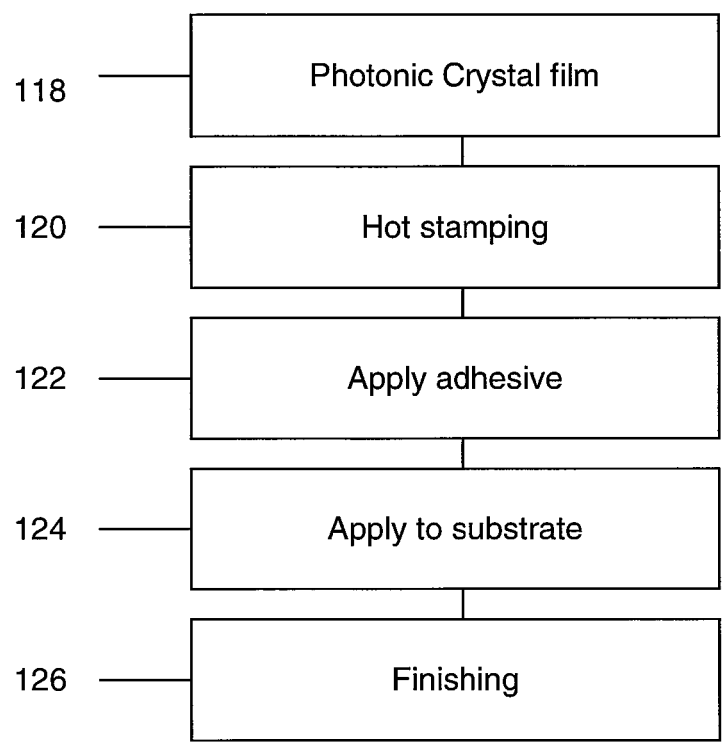

Referring to the flow diagram of FIG. 22, at step 118 a photonic crystal film, processed in accordance with FIG. 1 is provided.

At step 120, the film is passed into a hot stamping apparatus which performs a hot stamping process upon the material, causing localised deformation. The hot stamping apparatus applies pressure to selected areas of the film, these areas comprising, for example, regions corresponding to Region B in the earlier examples. In this case the process is performed at an elevated temperature which is in excess of the glass transition temperature of the polystyrene. The temperature may even be in excess of the melting temperature of the polystyrene. A heated die, stamp or roller can be used to perform this function. The hot stamping process causes the opal-like structure of the film to be disrupted by permanently plastically deforming or melting the spheres, causing them to amalgamate and lose their relative ordered structure. It should be noted that a heated stamp, die or roller may be used having a geometry such that the parts of the material corresponding to Region B are formed according to particular indicia or indeed negative indicia (whereby indicia themselves are formed from the boundaries of the second region).

The film is then optionally cooled and, in step 122, an adhesive layer may be applied.

Following the application of adhesive, at step 124 the photonic crystal film is then adhered to a substrate material such as a banknote, credit card, passport or other document of value. At step 126 various finishing processes are performed such as further printing, laminating, cutting and processes for adding further security features.

Thus a security document is produced having a photonic crystal material with regions exhibiting an optically variable effect, and other regions in which a different optical effect is observed, which in the present case is not optically variable. In the present case, these latter regions may therefore appear to have a diffuse translucent appearance which contrasts with the optically variable appearance of the other regions. One of the key advantages of this is that each of these regions is contained within the same continuous film which is more difficult to counterfeit.

One particular alternative to the hot stamping process discussed in association with step 120 is the use of a modified process in which the temperature of the hot stamp/die/roller is such that the material is heated to a temperature between the glass transition temperature of the matrix and that of the spheres themselves. This allows the spheres to remain substantially solid and yet able to move within the material matrix. Using an appropriately shaped stamp for example, such as one having a very shallow inclined surface, the spheres may be caused to partition away from parts of the material so as to form a region of only PEA matrix with substantially no spheres present. In this case the spheres are not destroyed but are rather displaced to an area around the region in question. Thus, the substantially sphere-free region and the region into which the spheres are displaced may exhibit individual and different optical effects, again providing enhanced security against counterfeiting.

In the examples described herein, involving the use of deformation processes such as stamping and rolling where the film is deformed between two members, then it will be appreciated that these members may have a symmetrical form and apply equal deformation upon each side of the film. In other cases a first one of the members may be fixed in position with the other being arranged to moved towards the first, with the film therebetween.

Whilst the above example in association with FIG. 22 has been discussed with the use of an adhesive so as to bond the device to a document of value, it will be appreciated that a film produced according to these processes could be incorporated into a document of value such as a banknote by a process similar to the formation of a windowed thread using watermarking techniques.

The invention claimed is:

1. A method of forming a film of photonic crystal material, comprising:
   providing a material having a material structure comprising core-shell particles and being capable of having a photonic crystal structure;
   performing a first process upon the material which causes deformation of the material so as to form a film in which incident light received by the material is selectively reflected or transmitted to generate a first optical effect in the film, the first process including an extrusion process in which the material is forced through an extrusion die, thereby causing the shells of the particles to form a matrix and rearranging the cores of the particles with respect to each other within the matrix;
   applying a first cover film to a first surface of the film and applying a second cover film to a second opposite surface of the film, wherein heat and pressure are applied to cause the first and second cover films to adhere to the first and second surfaces, respectively, the first and second cover films providing mechanical support to the film, and the first and second cover films are each self-supporting; and
   performing a second process upon the film which applies a shear stress to the film, thereby causing a change in the material structure so as to generate a second optical effect in the form of a photonic effect in the film in response to incident light, due to increased ordering in the relative arrangement of the cores, the second optical effect being different from the first optical effect, wherein
   the shear stress of the second process is applied as a force which causes a net displacement of one cover film with respect to the other cover film in an elongate direction of the film.

2. The method according to claim 1, wherein the film has a maximum dimension in the elongate direction, an intermediate dimension in a width direction that is normal to the elongate direction, and a minimum dimension in a thickness direction that is normal to each of the elongation and width directions.

3. The method according to claim 2, wherein the second optical effect is present across width of the film in the width direction.

4. The method according to claim 1, further comprising forming a continuous film.

5. The method according to claim 1, wherein a thickness of the film is 100 micrometres or less.

6. The method according to claim 5, wherein the thickness of the film is 40 micrometres or less.

7. The method according to claim 1, further comprising, after the first process, performing a calendaring process on the film before performing the second process.

8. The method according to claim 7, wherein the calendaring process applies a pressure to the film of between 50 and 200 bar, and a temperature of 80 to 120 degrees Celsius.

9. The method according to claim 1, further comprising performing a cross-linking process during the second process or after the second process.

10. The method according to claim 9, wherein the cross-linking process is a thermal process.

11. The method according to claim 1, wherein the shear stress of the second process is applied to at least one of the first cover film and the second cover film.

12. The method according to claim 1, wherein each of the first process and the second process are performed at respective first elevated and second elevated temperatures, and, between the performing of the first process and the second process, the material remains at a temperature at or above the second elevated temperature.

13. The method according to claim 12, wherein each of the first and second elevated temperatures is in excess of a glass transition temperature of a matrix component of the photonic crystal material.

14. The method according to claim 1, wherein the material exhibits an optically variable effect as a result of the first process and/or the second process.

15. The method according to claim 1, wherein the second optical effect is an enhanced first optical effect which produces a higher intensity response to incident radiation than the first optical effect.

16. The method according to claim 1, wherein the second process causes an increase of crystalline order within the photonic crystal material.

17. The method according to claim 1, wherein the second process is applied within a heated chamber.

18. The method according to claim 1, wherein the shear stress of the second process is applied by passing the material over at least one sharp edge.

19. The method according to claim 18, wherein respective parts of the film upstream of the edge, passing over the edge, and downstream of the edge, define an angle of 120 degrees or less, the angle being subtended by the edge.

20. The method according to claim 18, wherein the edge comprises a low friction material.

21. The method according to claim 18, wherein the edge is heated.

22. The method according to claim 21, wherein the edge is heated to 200 degrees Celsius.

23. The method according to claim 18, wherein the shear stress applied to the film is controlled by rollers which grip the film upstream and downstream of the edge.

24. The method according to claim 23, wherein the upstream rollers are heated.

25. The method according to claim 1, further comprising cooling the film following the second process using one or more cooled rollers.

26. The method according to claim 1, wherein an optically absorbent material additive is provided to the material prior to or during the first process, the optically absorbent material additive comprising a dye or ink.

27. The method according to claim 1, wherein nanoparticles are provided to the material prior to or during the first process.

28. The method according to claim 1, wherein the photonic material comprises a polyethylacrylate matrix containing spheres of cross-linked polystyrene.

29. The method according to claim 1, wherein the second optical effect comprises a peak in a transmissive absorbance spectrum through the film, the peak exhibiting a shift in wavelength as a function of rotation of a line defining an emitter and detector, the line passing through the film and rotating about a rotation axis lying within a plane of the film.

30. The method according to claim 29, wherein the rotation axis is aligned parallel to a direction of elongation of the film or perpendicular to said direction.

31. The method according to claim 1, further comprising applying a third process to the film so as to modify the material structure of the material in one or more regions.

32. The method according to claim 31, wherein the one or more regions have an opal structure having a reduced degree of crystal ordering with respect to the rest of the film.

33. The method according to claim 31, wherein the third process is a deformation process causing disordering of the material structure in the one or more regions.

34. The method according to claim 31, wherein, when the third process is an embossing process, an embossing takes place during an intaglio printing process and is carried out using an intaglio plate.

35. The method according to claim 1, wherein the film has a photonic crystal structure comprising a number of objects of similar geometry, formed from a first material located within a matrix of a second material different from the first material, the method further comprising removing the number of objects of the first material from the photonic crystal material when arranged in an opal structure so as to form an inverse opal structure.

36. The method according to claim 1, further comprising applying a third process to the film so as to modify the material structure of the material in one or more regions, wherein the photonic crystal structure of the film comprises a number of objects of similar geometry, formed from a first material located within a matrix of a second material different from the first material, the method further comprising removing the objects of the first material from the photonic crystal material when arranged in an opal structure so as to form an inverse opal structure, the removal of the objects being performed as part of the third process and applied to the said one or more regions.

37. The method according to claim 35, wherein the objects of similar geometry are removed by applying a solvent to the objects.

38. The method according to claim 37, wherein the solvent is applied by one or more of processes of: (i) immersing the material in a bath of solvent, or (ii) printing the solvent onto the photonic crystal material.

39. The method according to claim 35, wherein prior to the removal of the objects of similar geometry, an area of the first material is protected by application of a mask.

40. The method according to claim 35, further comprising applying a further deformation process to part of the inverse opal structure.

41. The method according to claim 1, further comprising adhering the film to a substrate or carrier layer.

42. The method according to claim 1, further comprising incorporating the film into a security device.

43. The method according to claim 1, wherein the first and second cover films are each wider than the film.

* * * * *